United States Patent
Davydov et al.

(10) Patent No.: US 11,515,924 B2
(45) Date of Patent: *Nov. 29, 2022

(54) BEAM FAILURE RECOVERY OPERATION

(71) Applicant: Apple Inc., Cupertino, CA (US)

(72) Inventors: Alexei Davydov, Nizhny Novgorod (RU); Guotong Wang, Beijing (CN); Yushu Zhang, Beijing (CN); Seunghee Han, San Jose, CA (US); Dae Won Lee, Portland, OR (US); Gang Xiong, Portland, OR (US)

(73) Assignee: Apple Inc., Cupertino, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 17/011,629

(22) Filed: Sep. 3, 2020

(65) Prior Publication Data

US 2020/0403683 A1  Dec. 24, 2020

Related U.S. Application Data

(63) Continuation of application No. 16/166,521, filed on Oct. 22, 2018, now Pat. No. 10,784,943, which is a continuation of application No. PCT/CN2018/077014, filed on Feb. 23, 2018.

(60) Provisional application No. 62/575,887, filed on Oct. 23, 2017, provisional application No. 62/585,195, (Continued)

(51) Int. Cl.
| | | |
|---|---|---|
| *H04B 7/06* | (2006.01) | |
| *H04W 74/00* | (2009.01) | |
| *H04L 67/10* | (2022.01) | |
| *H04W 72/04* | (2009.01) | |
| *H04L 5/00* | (2006.01) | |
| *H04W 24/04* | (2009.01) | |

(52) U.S. Cl.
CPC .......... *H04B 7/0695* (2013.01); *H04L 5/006* (2013.01); *H04L 5/0053* (2013.01); *H04L 67/10* (2013.01); *H04W 72/0413* (2013.01); *H04W 74/002* (2013.01); *H04L 5/0023* (2013.01); *H04W 24/04* (2013.01)

(58) Field of Classification Search
CPC .......... H04W 72/0413; H04W 74/002; H04W 24/04; H04L 67/10; H04L 5/006; H04L 5/0053; H04L 5/0023; H04B 7/0695
See application file for complete search history.

(56) References Cited

U.S. PATENT DOCUMENTS

2018/0302889 A1 * 10/2018 Guo .................. H04B 7/088
2018/0323856 A1   11/2018 Xiong et al.
2019/0053294 A1   2/2019 Xia et al.
(Continued)

*Primary Examiner* — Chi Ho A Lee
(74) *Attorney, Agent, or Firm* — Sterne, Kessler, Goldstein & Fox P.L.L.C.

(57) ABSTRACT

Described is an apparatus of a User Equipment (UE) operable to communicate with a fifth-generation Evolved Node-B (gNB) on a wireless network. The apparatus may comprise a first circuitry, a second circuitry, and a third circuitry. The first circuitry may be operable to detect a beam failure event. The second circuitry may be operable to generate a beam failure recovery request for transmission to the gNB, in response to the beam failure event. The third circuitry my be operable to monitor for Physical Downlink Control Channel (PDCCH) in a search space configured by the gNB, subsequent to a transmission of the beam failure recovery request.

20 Claims, 13 Drawing Sheets

Related U.S. Application Data filed on Nov. 13, 2017, provisional application No. 62/589,840, filed on Nov. 22, 2017.

(56) References Cited

U.S. PATENT DOCUMENTS

| | | |
|---|---|---|
| 2019/0075014 A1 | 3/2019 | Zhou et al. |
| 2019/0081753 A1 | 3/2019 | Jung et al. |
| 2019/0082334 A1 | 3/2019 | Nagaraja et al. |
| 2019/0166539 A1 | 5/2019 | Chen et al. |
| 2019/0200248 A1 | 6/2019 | Basu Mallick et al. |
| 2019/0200396 A1 | 6/2019 | Agiwal |
| 2019/0253127 A1 | 8/2019 | Kang et al. |
| 2020/0221429 A1* | 7/2020 | Li ................. H04W 72/042 |
| 2020/0358574 A1* | 11/2020 | Jung ............... H04W 72/046 |

\* cited by examiner

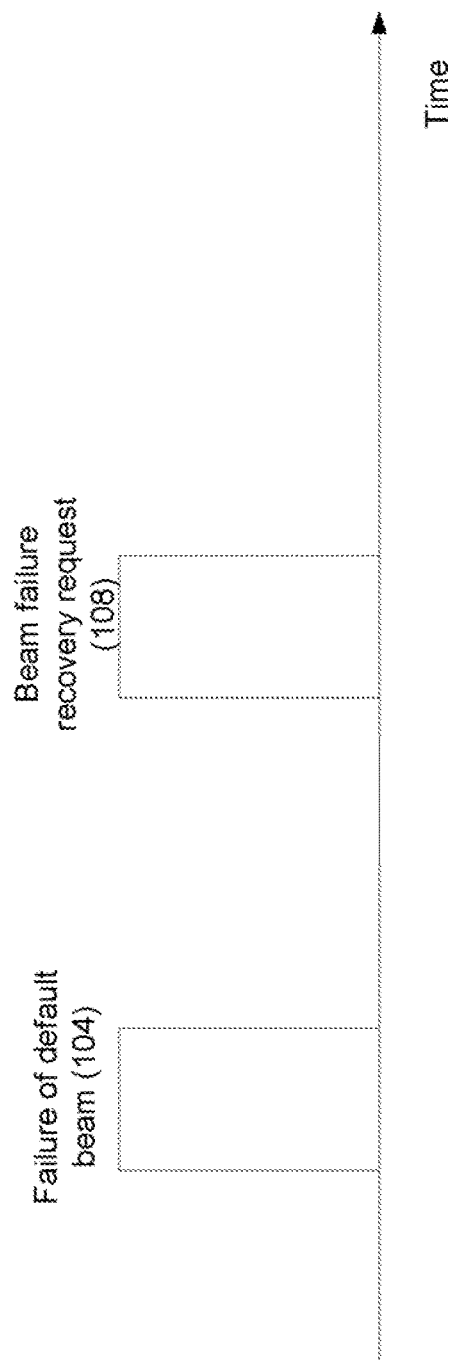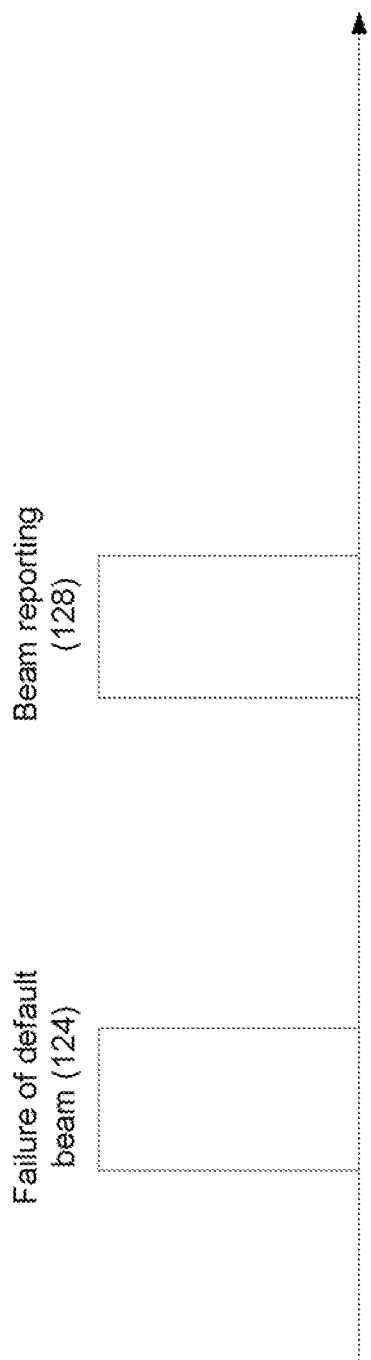

BEAM FAILURE RECOVERY OPERATION

CLAIM OF PRIORITY

The present application is a continuation of U.S. Non-Provisional patent application Ser. No. 16/166,521, filed on Oct. 22, 2018 and titled "Beam Failure Recovery Operation," which claims priority under 35 U.S.C. § 119 to U.S. Provisional Patent Application Ser. No. 62/575,887 filed Oct. 23, 2017 and entitled "System and Method for Beam Failure Recovery Operation," claims priority under 35 U.S.C. § 119 to U.S. Provisional Application Ser. No. 62/585,195 filed Nov. 13, 2017 and entitled "Method of radio link monitoring and beam failure detection using multiple antenna ports," claims priority under 35 U.S.C. § 119 to U.S. Provisional Patent Application Ser. No. 62/589,840 filed Nov. 22, 2017 and entitled "System and Method for reference signal for beam failure detection and radio link monitor," and claims priority under 35 U.S.C. § 365 to Patent Cooperation Treaty International Patent Application Number PCT/CN2018/077014 filed Feb. 23, 2018 and entitled "System and Method for reference signal for beam failure detection and radio link monitor," which are herein incorporated by reference in their entirety.

BACKGROUND

A variety of wireless cellular communication systems have been implemented, including a 3rd Generation Partnership Project (3GPP) Universal Mobile Telecommunications Systems (UMTS) system, a 3GPP Long-Term Evolution (LTE) system, and a 3GPP LTE-Advanced (LTE-A) system. Next-generation wireless cellular communication systems based upon LTE and LTE-A systems are being developed, such as a Fifth Generation (5G) wireless system/5G mobile networks system. Next-generation wireless cellular communication systems may provide support for higher bandwidths in part by supporting higher carrier frequencies, such as centimeter-wave and millimeter-wave frequencies.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

FIG. 1A illustrates an example where a User Equipment (UE) transmits a Beam failure recovery request to a gNB (5G-capable or next generation capable Evolved-Node-B), in response to a failure of a default beam, according to some embodiments.

FIG. 1B illustrates an example where a UE transmits a Beam reporting to a gNB, in response to a failure of a default beam, according to some embodiments.

DETAILED DESCRIPTION

Figure 2A:
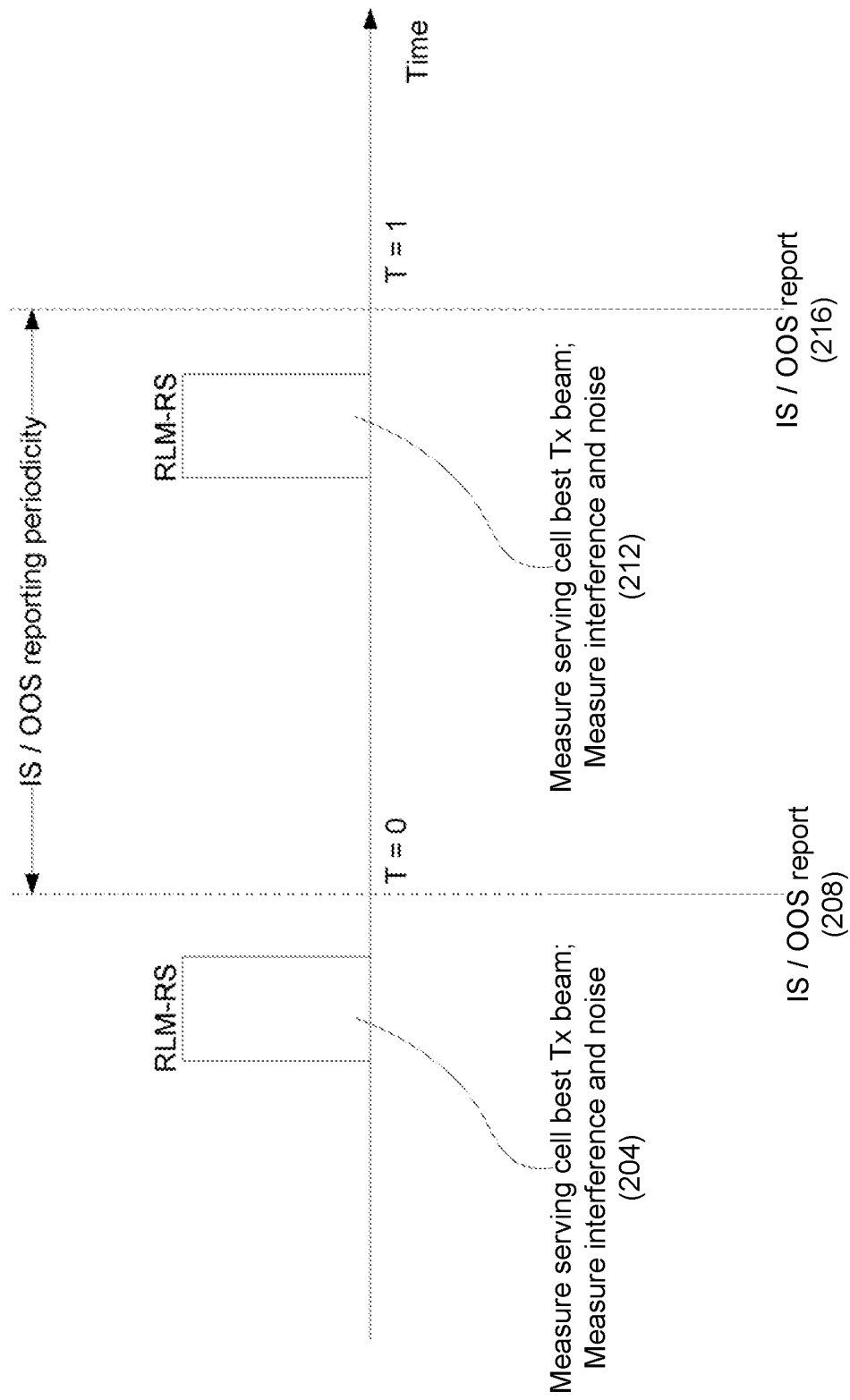
FIG. 2A illustrates a periodicity of IS (in-sync) reports and/or OOS (out-of-sync) reports, where the IS and/or OOS reports are generated based on Radio link monitoring-Reference Signal (RLM-RS) measurements, according to some embodiments.

For purposes of the present disclosure, the term "eNB" may refer to a legacy LTE capable Evolved Node-B (eNB), a next-generation or 5G capable eNB, a centimeter-wave (cmWave) capable eNB or a cmWave small cell, a millimeter-wave (mmWave) capable eNB or an mmWave small cell, an Access Point (AP), and/or another base station for a wireless communication system. The term "gNB" may refer to a 5G-capable or NR (next generation) capable eNB. For purposes of the present disclosure, the term "UE" may refer to a legacy LTE capable User Equipment (UE), an mmWave capable UE, a cmWave capable UE, a Station (STA), and/or another mobile equipment for a wireless communication system. The term "UE" may also refer to a next-generation or 5G capable UE.

Various wireless cellular communication systems have been implemented or are being proposed, including 3rd Generation Partnership Project (3GPP) Universal Mobile Telecommunications Systems (UMTS), 3GPP Long-Term Evolution (LTE) systems, 3GPP LTE-Advanced (LTE-A) systems, and 5th Generation (5) wireless systems/5G mobile networks systems/5G New Radio (NR) systems.

In 5G NR communication, beam failure recovery mechanism includes one or more of the following aspects beam failure detection, new candidate beam identification, beam failure recovery request transmission, etc. In response to a beam failure recovery request transmission by a UE to a gNB, the UE monitors for gNB response for beam failure recovery request (e.g., the gNB ma transmit a beam failure recovery response).

If a new candidate beam identification (e.g., because of beam failure detection) is based on Level 1 Reference Signal Receive Power (L1-RSRP), an actual control channel performance may not be taken into account, e.g., as interference is not taken into account while performing the L1-RSRP. In some embodiments, a new candidate beam identification may be based on Reference Signal Receive Quality (RSRQ) and/or Signal to Interference Noise Ratio (SINR).

In an example, the Physical Downlink Shared Channel (PDSCH) may be associated with a default beam, and if a default beam fails, the UE may let the gNB know about the failure, e.g., as soon as possible. Thus, the UE may perform beam failure recovery if there is no available resource for beam reporting.

In an example, if the beam failure recovery request is multiplexed with Scheduling Request (SR), merely one Physical Random Access Channel (PRACH) resource may be configured, e.g., if the beam correspondence holds. If the gNode B does not hold the beam correspondence, the gNode B may configure multiple PRACH resources, and may configure separate resource(s) for the Scheduling Request.

In an example, after sending a beam failure recovery request, the UE may monitor the Physical Downlink Control Channel (PDCCH) Control Resource Set (CORESET) for the gNode B response. A CORESET that is to be used may be indicated by the gNode B.

As will be discussed in further details herein, various embodiments of this disclosure propose method and apparatus for new candidate beam identification, e.g., in response to beam failure recovery. In some embodiments, beam failure recovery may be triggered if a default beam for PDSCH fails. In some embodiments, multiplexing between beam failure recovery request over PRACH with Scheduling Request (SR) may be used if, for example, merely one PRACH resource is configured. If beam correspondence does not hold, the gNode B may configure multiple PRACH resources, and may configure a separate PRACH resource for scheduling request. In some embodiments, after transmitting a beam failure request, a UE may monitor PDCCH CORESET for gNode B response. A CORESET that is to be monitored by the UE may be indicated by the gNode B.

In the following description, numerous details are discussed to provide a more thorough explanation of embodiments of the present disclosure. It will be apparent to one skilled t the art, however, that embodiments of the present disclosure may be practiced without these specific details. In other instances, well-known structures and devices are show in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front" "back," "top," "bottom," "over" "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B). (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy LTE capable Evolved Node-B (eNB), a next-generation or 5G capable eNB, a centimeter-wave (cmWave) capable eNB or a cmWave small cell, a millimeter-wave (mmWave) capable eNB or an mmWave small cell, an Access Point (AP), and/or another base station for a wireless communication system. The term "gNB" may refer to a 5G-capable or NR-capable eNB. For purposes of the present disclosure, the term "UE" may refer to a legacy LTE capable User Equipment (UE), an mmWave capable UE, a cmWave capable UE, a Station (STA), and/or another mobile equipment for a wireless communication system. The term "UE" may also refer to a next-generation or 5G capable UE.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in. e.g., hardware and/or software-configured elements), such as by moving a transmission to be sent by an eNB or a UE through one or more layers of a protocol stack.

In various embodiments, resources may span various Resource Blocks (RBs), Physical Resource Blocks (PRBs), and/or time periods (e.g., frames, subframes, and/or slots) of a wireless communication system. In some contexts, allocated resources (e.g., channels, Orthogonal Frequency-Division Multiplexing (OFDM) symbols, subcarrier frequencies, resource elements (REs), and/or portions thereof) may be formatted for (and prior to) transmission over a wireless communication link. In other contexts, allocated resources (e.g., channels. OFDM symbols, subcarrier frequencies, REs, and/or portions thereof) may be detected from (and subsequent to) reception over a wireless communication link.

In 5G NR communication, a measurement metric for beam failure detection may be based on a hypothetical PDCCH block error rate (BLER). For new gNB candidate transmit beam identification, it is to be decided as to which measurement metric is to be used.

The new candidate beam identification may be based on L1-RSRP. In such an example, the new transmit beam identification may be consistent with beam management procedures, where the beam management procedures may be based on L1-RSRP.

In an example, however, since the beam failure recovery focuses (e.g., mainly focuses) on the control channel performance (e.g., which may be directly associated with the SINR or BLER), the L1-RSRP may not show an actual control channel status, e.g., as the interference is not considered in the L1-RSRP measurement.

In some embodiments, the new gNB candidate transmit beam identification is based on the measured RSRQ. For example, abeam to be identified may be abeam for Synchronization Signal Block (SSB) or for Channel State Information-Reference Signals (CSI-RS) (e.g., the beam may be an SSB beam or a CSI-RS). In some embodiments, depending on whether the beam to be identified is an SSB beam or a CSI-RS, measurements for SSB RSRQ (SS-RSRQ) and/or measurement for CSI-RS RSRQ (CSI-RSRQ) may be used. If the measured RSRQ is better than a certain threshold, then the UE considers that a candidate beam has been found.

In some embodiments, another measurement metric for new gNB transmit beam identification is SINR. The SINR for SSB or CSI-RS can be used, e.g., depending whether the new beam to be identified is an SSB beam or a CSI-RS beam.

Thus, in one embodiment, the new gNB candidate transmit beam identification is based on the measured SINR. Depending on whether the beam identification is for SSB beam or CSI-RS beam, the SSB SINR (SS-SINR) or CSI-RS SINR (CSI-SINR) may be used accordingly. The SINR measurement may be performed on CSI-RS and/or SSB, or higher layered configured channel state information-interference measurement (CSI-IM) resource. If the measured SINR is better than a certain threshold, then the UE considers that a candidate beam is found.

Thus, in some embodiments, measurements of the RSRQ and/or the SINR can be used for a new beam identification. For example, for identification of a new beam for SSB, measurements of SSB RSRQ and/or SINR for SSB are used. In another example, for identification of a new beam for CSI-RS, measurements of CSI-RSRQ and/or SINR for CSI-RQ are used.

In some embodiments, the network may configure which measurement metric (e.g., one or more of RSRP, RSRQ, SINR, and/or the like) is to be used for new gNB candidate transmit beam. Thus, the network may provide a selection of the measurement metric to be used. For example, the network can configure a selection of one or more of L1-RSRP, RSRQ, or SINR. Additionally or alternatively, the UE reports its choice of the measurement metric in a UE capability report, and the gNB decides which measurement metric to be used based on the UE capability reporting.

In an example, the gNB and the UE may use a default, pre-defined, pre-configured, and/or rule-based beam for PDSCH, e.g., if the scheduling delay is smaller than a certain threshold, Thus, the maintenance of the default beam may be desirable. If the default beam fails, the UE has to let the gNB know the status as soon as possible, otherwise the gNB will keep sending beam indication over the default beam. Depending on whether the resource for beam reporting is available or not, the UE may send beam reporting or beam recovery to the gNB. For example, FIG. 1A illustrates an example where a UE transmits a Beam failure recovery request (108) to a gNB, in response to a failure of default beam (104), according to some embodiments. FIG. 1B illustrates an example where a UE transmits a Beam reporting (128) to a gNB, in response to a failure of default beam (124), according to some embodiments. For example, if resource for beam reporting is available, the UE may transmit the beam reporting at 128, e.g., in accordance with FIG.

1B. If resource for beam reporting is not available, the UE may transmit the beam failure recovery request at 108, e.g., in accordance with FIG. 1B. The X axis in both FIGS. 1A-1B represent time.

In some embodiments, if the default, pre-defined, pre-configured and/or rule-based beam for the PDSCH fails, the UE may let the gNB know about the failure of the default beam. If the UE has no available resource for beam reporting, the UE triggers beam failure recovery over PRACH and/or Physical Uplink Control Channel (PUCCH), e.g., as discussed with respect to FIG. 1A. If the UE has available resource for beam reporting, the UE may trigger beam reporting, e.g., as discussed with respect to FIG. 1B. The gNB updates the default beam setting according to the information carried over the beam recovery request and/or the beam reporting. In some embodiments, the updated default beam information is transmitted by the gNB to the UE.

In some embodiments, the L1-RSRP, the hypothetical BLER, the RSRQ and/or the SINR are used to judge or determine whether the default, pre-defined, pre-configured and/or rule-based beam has failed. The threshold used for the determination may be independently defined and/or configured. Dedicated PRACH or PUCCH resource may be used for the default beam failure recovery.

In some embodiments, if a subset of the serving control channels (e.g., other than the default beam) fails, the UE performs beam reporting. The gNB updates the default beam setting based on the beam reporting, e.g., especially if the default beam is set to be the same with the best (or near optimal) beam for the serving control channels.

In some embodiments, the default beam failure may be measured based on L1-RSRP, hypothetical PDCCH BLER, RSRQ (SS-RSRQ or CSI-RSRQ), and/or SINR (SS-SINR or CSI-SINR). The gNB may configure the measurement metric that is to be used, or the gNB may select the measurement metric based on the UE capability reporting.

In some embodiments, a Scheduling Request (SR) may be transmitted using, for example, a preamble of a beam failure request in a dedicated PRACH resource. If the PRACH time and/or frequency resource is associated with the SSB or CSI-RS resource (e.g., which is spatially Quasi Co-Located (QCLed) with DMRS of any one of the UE-specific PDCCHs of one UE), then the gNB may treat it as a scheduling request—otherwise, the gNB may treat it as a normal beam failure recovery request.

In an example, however, if the beam correspondence does not hold at the gNB side, Rx (receive) beam sweeping may be used at the gNode B side. In this case, multiple PRACH resource may be configured. If one beam failure recovery request is treated as SR, the gNB may assume to use the beam, which might be different with the results of gNB beam sweeping. Thus, in some examples, some restriction may be used.

If the beam correspondence holds at both the UE and the gNB sides, merely one PRACH resource is to be used, and in this case, multiplexing with SR may be used. If beam correspondence does not hold at the gNB, multiple resource may be configured and separate resource for SR may be configured.

In some embodiments, if beam correspondence holds at both the gNB and the UE side, the gNB may configure only one dedicated PRACH resource to the UE for beam failure recovery. Also, the UE may multiplex scheduling request with the beam failure recovery request using the dedicated PRACH resource.

In some embodiments, if the gNode B does not hold the beam correspondence, the gNode B may configure multiple dedicated PRACH resource to the UE for beam failure recovery. The gNode B may configure separate PRACH resource to the UE for scheduling request SR.

Thus, whether or not the SR and PRACH for beam recovery can be transmitted based on the same preamble index can be determined, for example, by the number of PRACH resource configured for beam failure recovery and/or SR.

In some embodiments, in response to detection of a beam failure, the UE transmits a beam failure recovery request to the gNB, e.g., as discussed with respect to FIG. 1B. After the transmission of the beam failure recovery request to the gNB, the UE monitors for a beam failure recovery response from the gNB. For example, the UE monitors the CORESET from the gNB, where PDCCHs are transmitted within respectively CORESETs. After the UE transmits the beam failure recovery request to the gNB, one or more CORESETs that are to be monitored by the UE (e.g., for the beam failure recovery response) may be indicated, pre-configured, and/or pre-defined to the UE by the gNode B.

Thus, put differently, the gNB indicates, pre-configures, and/or pre-defines to the UE one or more CORESETs that are to be monitored by the UE, wherein the monitoring by the UE occurs after the UE transmits the beam failure recovery request to the gNB. The monitoring is performed, so that the UE can identify the CORESET and/or the PDCCH within the CORESET, where the PDCCH includes the beam failure recovery response. For example, if the UE detects a beam failure of a first one or more beams, the CORESET including the beam failure recovery response is transmitted by the gNB using a second beam (e.g., which is different from the first one or more beams).

Thus, which CORESET(s) are to be monitored by the UE may be indicated, pre-configured, and/or pre-defined to the UE by the gNode B, which can be viewed as a default CORESET to monitor the gNode B response. After recovery from beam failure, the default CORESET may be updated and signaled to the UE.

Thus, in some embodiments, the UE may monitor one PDCCH CORESET after sending the beam failure recovery request. Which CORESET is to be monitored may be indicated, pre-configured, and/or pre-defined by the gNode B. After recovery from beam failure, the default CORESET may be updated and signaled to the UE.

Alternatively, one of a sub-set of CORESET may be used for PDCCH transmission, and the sub-set of CORESETs may be indicated by a bit-map in higher layer signaling. Thus, in such a scenario, the UE monitors for the sub-set of CORESETs, which may be used for PDCCH transmission.

Furthermore, after the beam recovery procedure, the gNB can trigger the CORESET reconfiguration, at least including the Quasi-Co-Locate (QCL) update for multiple CORESETs.

In some embodiments, the UE may monitor the indicated CORESET in K slots after the beam recovery request, where K can be pre-defined or configured by higher layer signaling. In an example, K can be predefined to be 0, then the UE may monitor the latest indicated CORESET after transmitting the beam recovery request. In another example, K can have a non-zero integer value. Thus, if the UE transmits the beam recovery request in slot "n", the UE monitors for the CORSET (e.g. for the PDCCH included within the CORESET, where the PDCCH includes the beam failure recovery response) from slot (K+n) onwards.

Radio link monitoring (RLM) at the UE is a procedure of measuring link quality to the serving cell. For example, from a set of reference signals (RS), the UE measures, whether the link quality is relatively good (e.g., in-sync or IS) or relatively bad (e.g., out-of-sync or OOS). FIG. 2A illustrates reporting periodicity of IS (in-sync) and/or OOS (out-of-sync), where the IS and/or OOS reports are generated based on Radio link monitoring-Reference Signal (RLM-RS) measurements, according to some embodiments. For example, in FIG. 2A, at 204, measurement of serving cell best Tx beam and/or measurement of interference and noise are performed, and at 208 an IS or an OOS report is transmitted (e.g., at time T=0) by the UE based on the measurement. Also, at 212, measurement of serving cell best Tx beam and/or measurement of interference and noise are performed, and at 216 an IS or an OOS report is transmitted (e.g., at time T=1) by the UE based on the measurement. The time period between T=0 and T=1 represents a reporting periodicity of the ISS/OOS. For example, the UE declares OOS, based on the hypothetical BLER calculation on control channel using channel measurement from RLM-RS, which can be SSS or CSI-RS.

In an example, similar to RLM, a beam recovery procedure defines beam failure event at the UE. For example, BLER obtained from CSI-RS measurements may be used to declare beam failure, e.g., if the calculated BLER for physical control channel is higher than a BLER threshold.

In an example, a problem with the beam recovery procedure is that CSI-RS signal in NR used for the channel measurement, and BLER calculation in RLM and beam recovery procedures can support up to two antenna ports. However, physical control channel transmission may merely support single antenna port. For such an example, it may be useful to define a procedure for BLER calculation using two antenna port channel measurements for CSI-RS.

Various embodiments of this disclosure propose method and apparatus for calculating BLER for control channel, e.g., which supports single antenna port using channel measurements from two antenna port CSI-RS. This can be further extended to larger number of antenna ports.

For example (and as will be discussed in further details herein later), in some embodiments, a UE may calculate BLER based on the precoding cycle using rank-1 codebook in some other embodiments, the UE may calculate BLER for each antenna port of CSI-RS, and may use lowest and/or highest BLER for comparison with threshold. In yet embodiments, one antenna port (e.g., a first or a second antenna port) is used for BLER calculation. For example, one CSI-RS resource with two antenna port may be used for beam management, CSI reporting, RLM, beam recovery procedures, etc.

In some embodiments, the UE calculates BLER based on the precoding cycling, e.g., using rank-1 codebook. Table 1 below illustrates a rank-1 codebook.

TABLE-1

| Codebook index | |
| --- | --- |
| 0 | $\frac{1}{\sqrt{2}}\begin{bmatrix}1\\1\end{bmatrix}$ |
| 1 | $\frac{1}{\sqrt{2}}\begin{bmatrix}1\\j\end{bmatrix}$ |

TABLE-1-continued

| Codebook index | |
| --- | --- |
| 2 | $\frac{1}{\sqrt{2}}\begin{bmatrix}1\\-1\end{bmatrix}$ |
| 3 | $\frac{1}{\sqrt{2}}\begin{bmatrix}1\\-j\end{bmatrix}$ |

In some embodiments, the UE may use most or all the PMIs from the codebook to calculate single port channel after precoding. In some other embodiments, the UE may be configured with codebook subset restriction, e.g., which indicates subset PMIs from rank 1 codebook that UE can use to calculate single port channel.

In some embodiments, the UE may calculate BLER per each antenna port of the CSI-RS. For example, if two antenna port CSI-RS is used, the UE may calculate two BLERs, e.g., respectively using channel measurement from each of the two CSI-RS antenna ports. For comparison with a BLER threshold, the UE may use the lowest in one example. For comparison with the BLER threshold, the UE may use the highest BLER in another example. In yet another example, for comparison with the BLER threshold, the UE may use an average BLER from the computed set of BLERs.

In some embodiments, merely one antenna port (e.g., a first antenna port or a second antenna port) is used for BLER calculation. The one antenna port to be used for the BLER calculation may be fixed (e.g., pre-configured), or may be indicated by the serving cell.

In some embodiments, for RLM and beam failure recovery, merely the 1 port CSI-RS is used for beam quality monitoring. For example, the UE expects to monitor a single port Reference Signal (RS), such as the CSI-RS from a single port, for RLM and/or beam failure detection. For example, if the BLER of the single port RS is lower than a threshold, a beam failure is detected.

In some embodiments, for beam failure recovery, if a CORESET is QCLed with an SSB, the UE expects the gNB to configure the CSI-RS (e.g., which is QCLed with the SSB) for beam quality monitoring. The QCL can be defined between a particular port of a two-port CSI-RS and an SSB. The UE may use the port of CSI-RS with the QCL indication for hypothetical BLER estimation.

In some embodiments, for beam failure recovery, the UE may be configured with the SSB, where the SSB may be QCLed with the antenna ports CSI-RS. The UE uses the channel measured on the corresponding SSB for hypothetical BLER estimation.

Figure 2B:
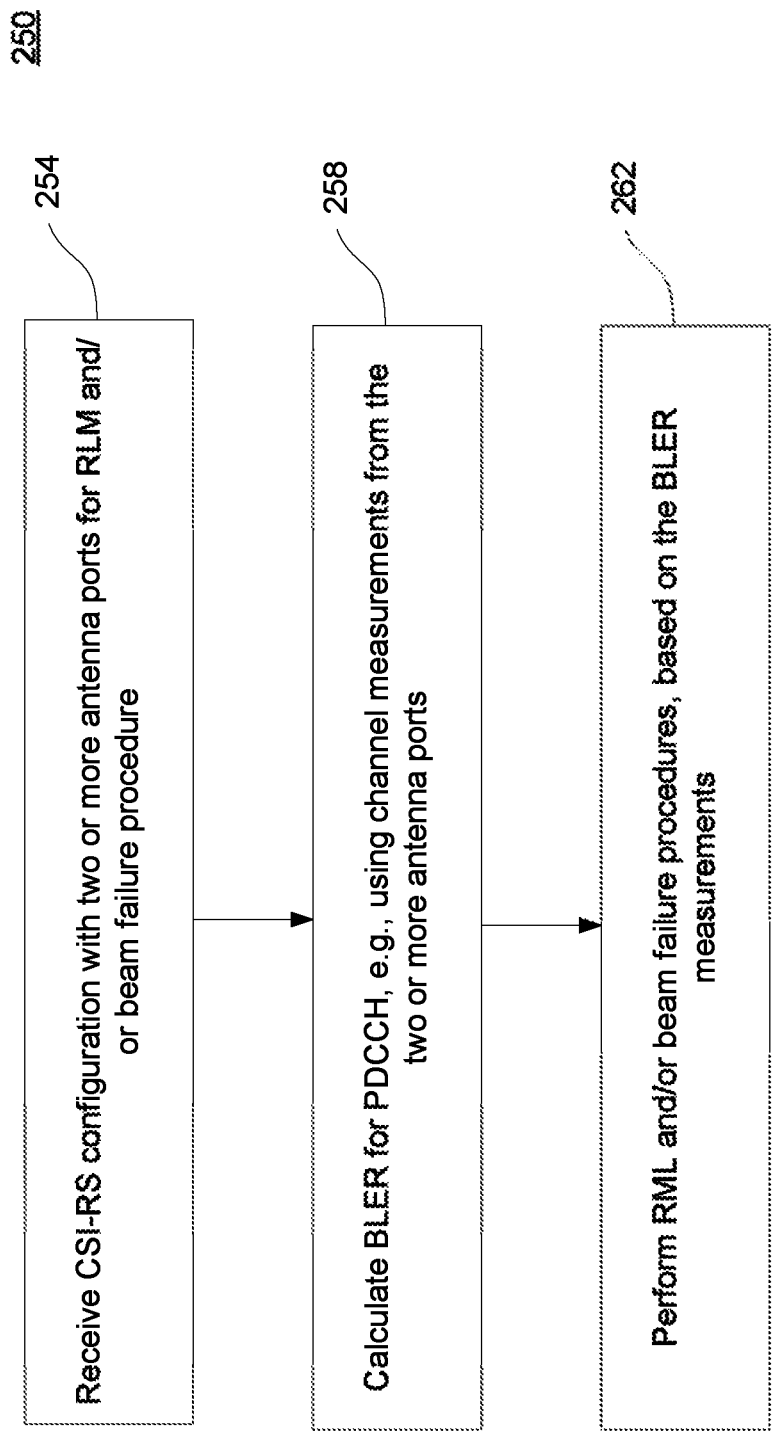
FIG. 2B illustrates a method for a UE for performing RLM and/or beam failure procedure, e.g., based on BLER measurements, according to some embodiments.

FIG. 2B illustrates a method 250 for a UE for performing RLM and/or beam failure procedure, e.g., based on BLER measurements, according to some embodiments. Although the actions in method 250 of FIG. 2B are shown in a particular order, the order of the actions can be modified. Thus, the illustrated embodiments can be performed in a different order, and some actions may be performed in parallel. Some of the actions and/or operations listed in FIG. 2B are optional in accordance with certain embodiments. The numbering of the actions presented is for the sake of clarity and is not intended to prescribe an order of operations in which the various actions must occur. Additionally, operations from the various flows may be utilized in a variety of combinations.

At 254, the UE receives CSI-RS configuration with two or more antenna ports. e.g., for RLM and/or beam failure procedure. At 258, the UE calculates the BLER for PDCCH, e.g., using channel measurements from the two or more antenna ports. At 262, the UE perform RLM and/or beam failure procedures, based on the BLER measurements, e.g., as discussed herein above in further details.

In an example, the SSB and the CS-RS can support beam sweeping operations, which may be used to measure the beam quality. For RLM and Beam Failure Detection (BFD), a hypothetical BLER for corresponding control channel may be used. Then the Reference Signal (RS), which is QCLed with the control channel, may be used to measure the hypothetical BLER. However, in an example, the SSB and CSI-RS may have different structures. e.g., different bandwidth, different frequency domain density, different number of antenna ports, etc. Table 2 below illustrates a comparison of the structure for the two RS signals, e.g., the SSB and the CSI-RS. In an example, one of the SSB and the CSI-RS may be selected for RLM and/or BFD.

TABLE 2

|  | SSB | CSI-RS |
|---|---|---|
| Bandwidth | 20 Resource Block (RB) | Smaller or equal to a bandwidth part (BWP) |
| Number of antenna ports | 1 | 1 or 2 |
| Frequency domain density | SSS: 127 REs in 12RB PBCH DMRS: 3 REs/RB | {1, 2, 3, 4, 6} REs per RB |
| Number of symbols | 3 symbols | 1 symbol |

Various embodiments of this disclosure propose apparatus and methods to determine the reference signal (RS) (e.g., the SSB, the CSI-RS, and/or the like) that is to be used for RLM and BFD. For example, the RS to be used for RLM and BFD may be based on bandwidth, total number of Resource Elements (REs), restriction on configuration for the RS, and/or the like, as will be discussed in further details herein.

In some embodiments, for the reference signal selection for RLM and BFD, whether the CSI-RS or SSB is to be used can be determined based on UE capability. For example, if the UE can support both the reference signals (e.g., the CSI-RS and the SSB), one or more of the following example ways may be adapted to select a reference signal for RLM and/or BFD. In an example, for RLM and BFD, a similar method or different methods may be used.

In some embodiments, a reference signal (e.g., either the CSI-RS or the SSB) can be selected based a bandwidth "B" RBs and the sire of a bandwidth part "W" RBs for the reference signals. A bandwidth of the SSB is fixed to be 20 RBs. On the other hand, a bandwidth of the CSI-RS is configurable, in an example, one or more thresholds (e.g., a threshold T) is defined, e.g., to determine which RS to be used. The threshold T may be predefined, or configured by higher layer signaling, and independent thresholds may be applied for 1-port CSI-RS and 2-port CSI-RS (e.g., a first threshold may be used for 1-port CSI-RS, and a second threshold may be used for 2-port CSI-RS).

Figure 3A:
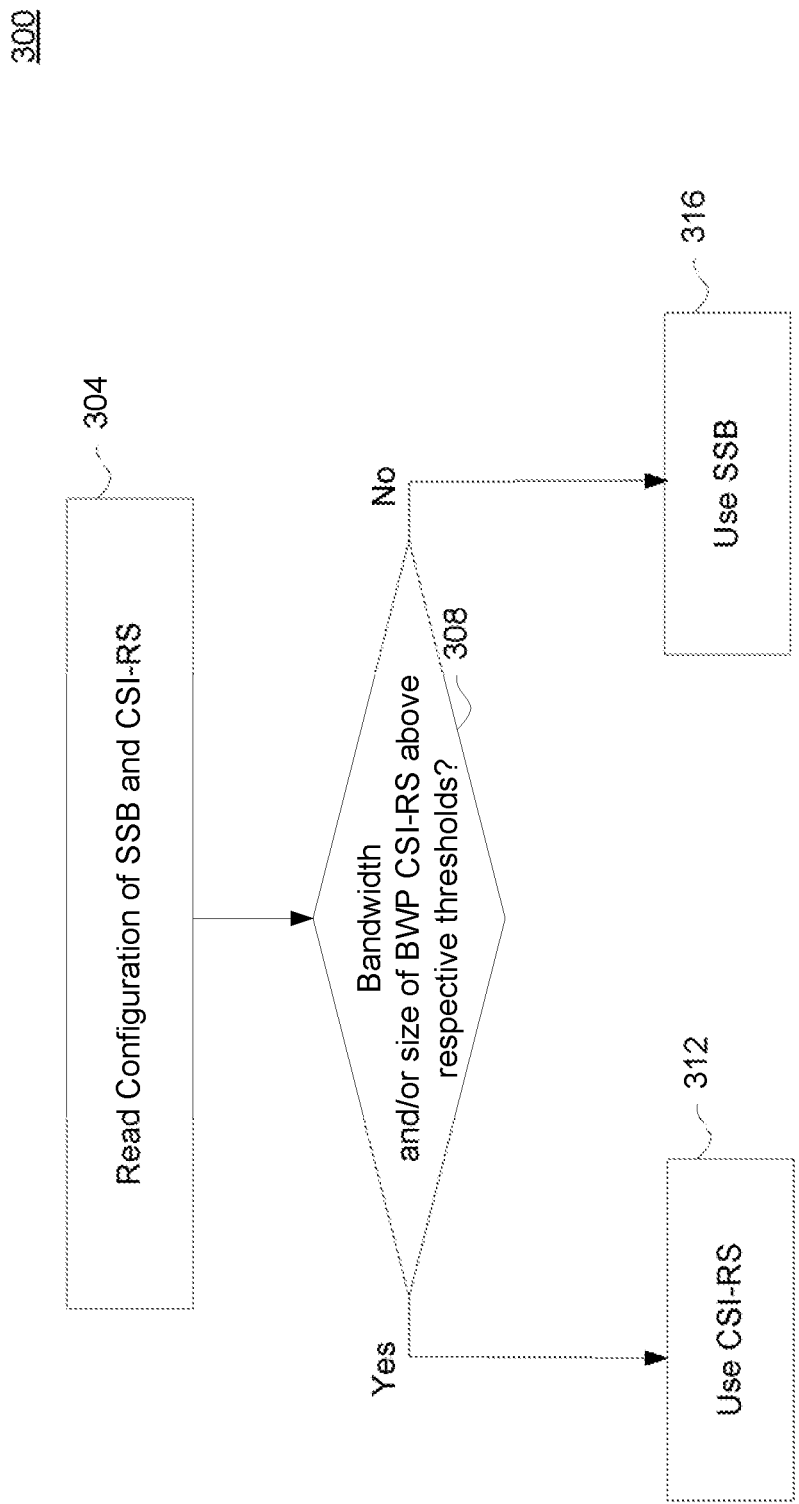
FIG. 3A illustrates a method depicting a selection process for selecting a reference signal (e.g., one of the CSI-RS (Channel State Information-Reference Signals) or the SSB (Synchronization Signal Block) that is to be used for RLM (Radio link monitoring) and/or BFD (Beam Failure Detection), according to some embodiments.

In some embodiments, if a bandwidth B of the CSI-RS is higher than the threshold T (e.g., if B>T), then the CSI-RS is to be used; otherwise, SSB is to be used. In some other embodiments, if (B/W−20/W)>T (e.g., where B is the bandwidth and W is the bandwidth part for the CSI-RS), the CSI-RS may be used; otherwise, SSB may be used. For example, FIG. 3A illustrates a method 300 depicting a selection process for selecting a reference signal (e.g., one of the CSI-RS or the SSB) that is to be used for RLM and BFD, according to some embodiments. At 304, the UE (or the gNB) reads configuration of the SSB and the CSI-RS. At 308, the UE (or the gNB) determines if a bandwidth and/or size of BWP of the CSI-RS are above respective thresholds. If "Yes" at 308, then at 312, the CSI-RS is selected (e.g., by the UE and/or the gNB) to be used for RLM and BFD. If "No" at 308, then at 316, the SSB is selected (e.g., by the UE and/or the gNB) to be used for RLM and BFD.

In some embodiments, which reference signal (e.g., either the CSI-RS or the SSB) to be used for RLM and/or BFD may be determined based on a number of resource elements (RE) used for the reference signals, e.g., as discussed with respect to FIG. 3B herein later. For example, if the number of REs for a symbol of the CSI-RS is larger than a number of REs for a symbol of the SSB, the CSI-RS may be selected for use; otherwise, the SSB may be selected. The number of REs for CSI-RS may be the number of REs for one port. The number of REs for SSB may be the number of REs for reference signal in the symbol including SSS and PBCH, which may count the SSS REs and the DMRS REs in the remaining 8 RBs.

In one example, if the CSI-RS is configured with 50 RBs and 3 REs per RB, then a total number of REs for the CSI-RS is 150. For SSB, a total number of REs may be a combination of 127 REs for SSS, and 24 REs for DMRS, e.g., a total of 151 REs. In such an example, the SSB may be selected for use.

Figure 3B:
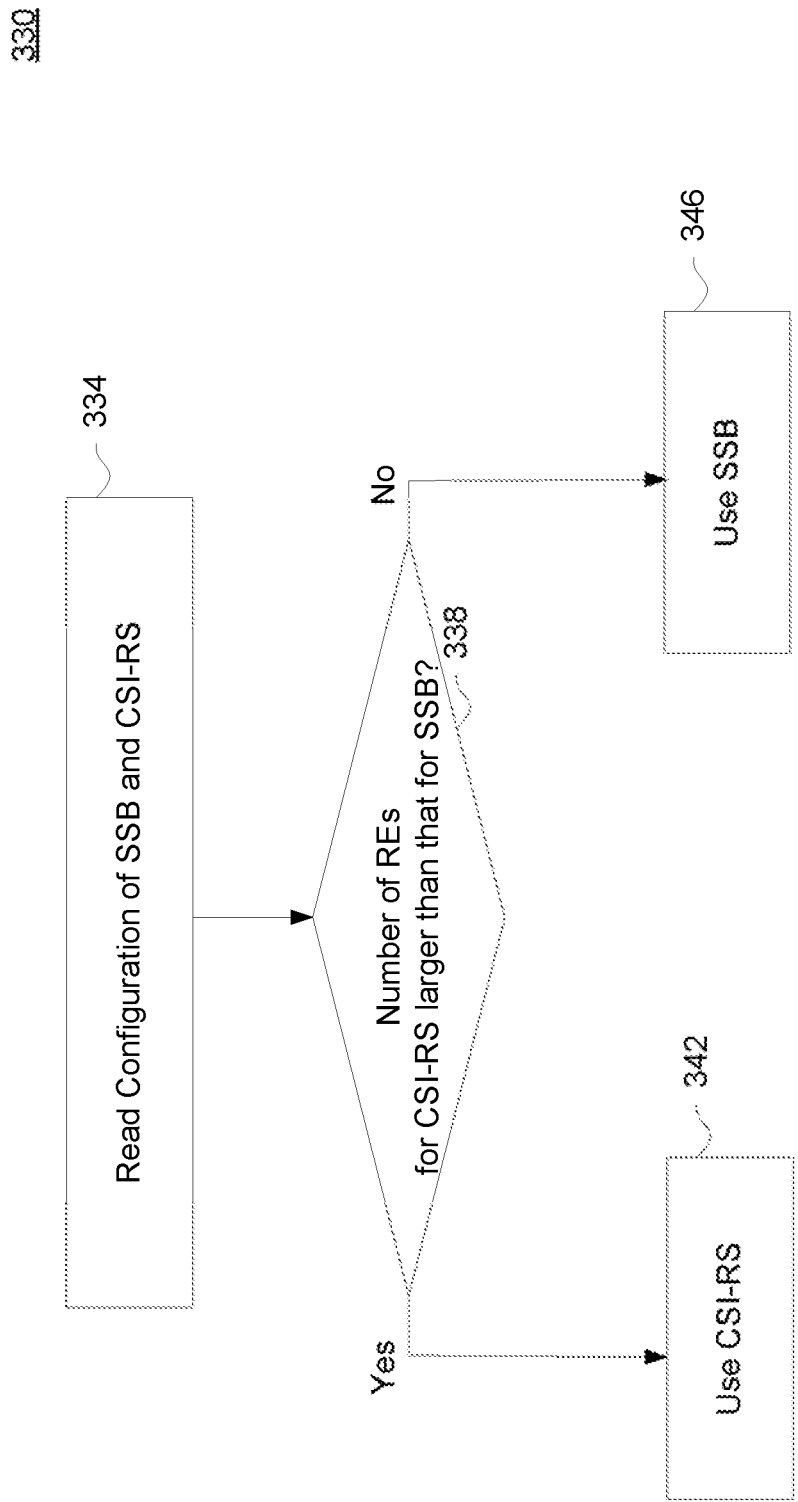
FIG. 3B illustrates a method depicting a selection process for selecting a reference signal (e.g., one of the CS-RS or the SSB) that is to be used for RLM and BFD, based on a number of Resource Elements (REs) associated with the CSI-RS and a number of REs associated with the SSB, according to some embodiments.

FIG. 3B illustrates a method 330 depicting a selection process for selecting a reference signal (e.g., one of the CSI-RS or the SSB) that is to be used for RLM and BFD, based on a number of Resource Elements (REs) associated with the CSI-RS and a number of REs associated with the SSB, according to some embodiments. At 334, the UE (or the gNB) reads configuration of the SSB and the CSI-RS. At 338, the UE (or the gNB) compares a number of REs for a symbol of the CSI-RS with a number of REs for a symbol of the SSB, e.g., as discussed herein above, and determines whether the number of REs for CSI-RS is larger than that for SSB. If "Yes" at 338, then at 342, the CSI-RS is selected (e.g., by the UE and/or the gNB) to be used for RLM and BFD, If "No" at 338, then at 346, the SSB is selected (e.g., by the UE and/or the gNB) to be used for RLM and BFD.

In some embodiments, which reference signal (e.g., either the CSI-RS or the SSB) to be used for RLM and/or BFD is determined based on a bandwidth "B" of the CSI-RS, a size of bandwidth part "W", and/or a number of REs for the CSI-RS and the SSB. If the bandwidth B of the CSI-RS is above a threshold, the CSI-RS may be used. If the bandwidth B of the CSI-RS is less than the threshold, and if a number of REs for the CSI-RS is larger than that of SSB, the CSI-RS may be used; otherwise the SSB may be used.

Figure 3C:
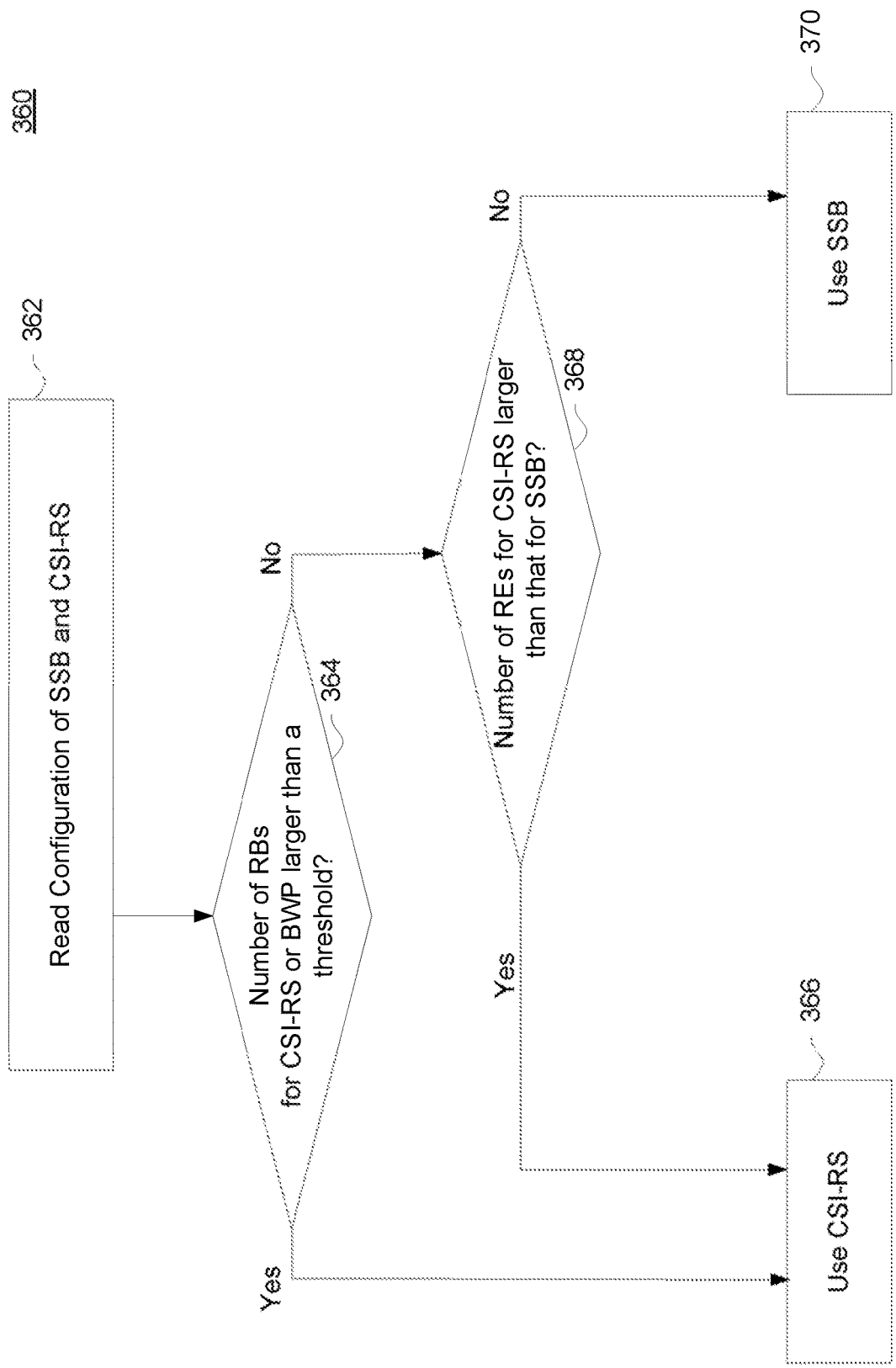
FIG. 3C illustrates a method depicting a selection process for selecting a reference signal (e.g., one of the CSI-RS or the SSB) that is to be used for RLM and BFD, based on one or more of: a bandwidth of the CSI-RS, a size of bandwidth part, or a number of REs for the CSI-RS and the SSB, according to some embodiments.

FIG. 3C illustrates a method 360 depicting a selection process for selecting a reference signal (e.g., one of the CSI-RS or the SSB) that is to be used for RLM and BFD, based on one or more of: a bandwidth of the CSI-RS, a size of bandwidth part, or a number of REs for the CSI-RS and the SSB, according to some embodiments. At 362, the UE (or the gNB) reads configuration of the SSB and the CSI-RS. At 364, the UE (or the gNB) determines whether a number of RBs for a symbol of the CSI-RS is larger than a threshold, and/or whether a bandwidth of the CSI-RS is larger than another threshold. If "Yes" at 364, then at 366 the CSI-RS is selected (e.g., by the UE and/or the gNB) to be used for RLM and BFD. If "No" at 364, then at 368, the UE (or the gNB) determines whether a number of REs of the CSI-RS is larger than that of SSB. If "Yes" at 368, then at 366 the CS-RS is selected (e.g., by the UE and/or the gNB) to be used for RLM and BFD. If "No" at 368, then at 370, the SSB is selected (e.g., by the UE and/or the gNB) to be used for RLM and BFD.

In an example, CSI-RS may include aperiodic CSI-RS, periodic CSI-RS, and/or semi-persistent CSI-RS. In some embodiments, aperiodic CSI-RS may not be used for RLM or BFD. Whether semi-persistent CSI-RS are to be used for RLM or BFD may be predefined or configured by higher layer signaling.

In some embodiments, at least the periodic CSI-RS (or merely the periodic CSI-RS, and not the aperiodic and/or semi-persistent CSI-RS) may be taken into account for RLM or BFD.

In some embodiments, if the SSB or CSI-RS has a periodicity higher than a threshold, the SSB or CSI-RS may not be used for RLM or BFD. The threshold may be the same or different for RLM and BFD.

In some embodiments, the UE may use the SSB or CSI-RS, which may be QCLed with the CORESET, for RLM and BFD. There may be more than 1 resources (e.g., SSB and/or CSI-RS) that are QCLed with the CORESET. Thus, the UE may use the SSB RS, which may be QCLed with the CORESET, for RLM and BFD; and the UE may use the CSI-RS, which may be QCLed with the CORESET, for RLM and BFD.

In some embodiments, the UE can use the SSB and/or CSI-RS resources, which are QCLed with the CORESET, e.g., for joint measurement for RLM and/or BFD. Then, an independent hypothetical BLER requirement may be defined for the joint measurement case. Alternatively, the UE may expect that the gNB would not configure more than one DL RS which are QCLed with one CORESET.

In some embodiments, which reference signal (e.g., SSB and/or CSI-RS) is to be used for BFD and/or RLM follows a priority rule, where the priority rule may be based on various options discussed with respect to FIGS. 3A, 3B, and 3C. Alternatively, the priority rule may be predefined (e.g. SSB has higher or lower priority than CSI-RS), and/or be configured by higher layer signaling.

If multiple CSI-RS resources are QCLed with the CORE-SET, the priority rule may be determined based on one or more of the density, transmission power, resource (or resource set ID), periodicity, bandwidth, and/or the like. In one example, the CS-RS resources with the lowest resource ID in a resource set with the lowest set ID can have the highest priority.

Figure 4:
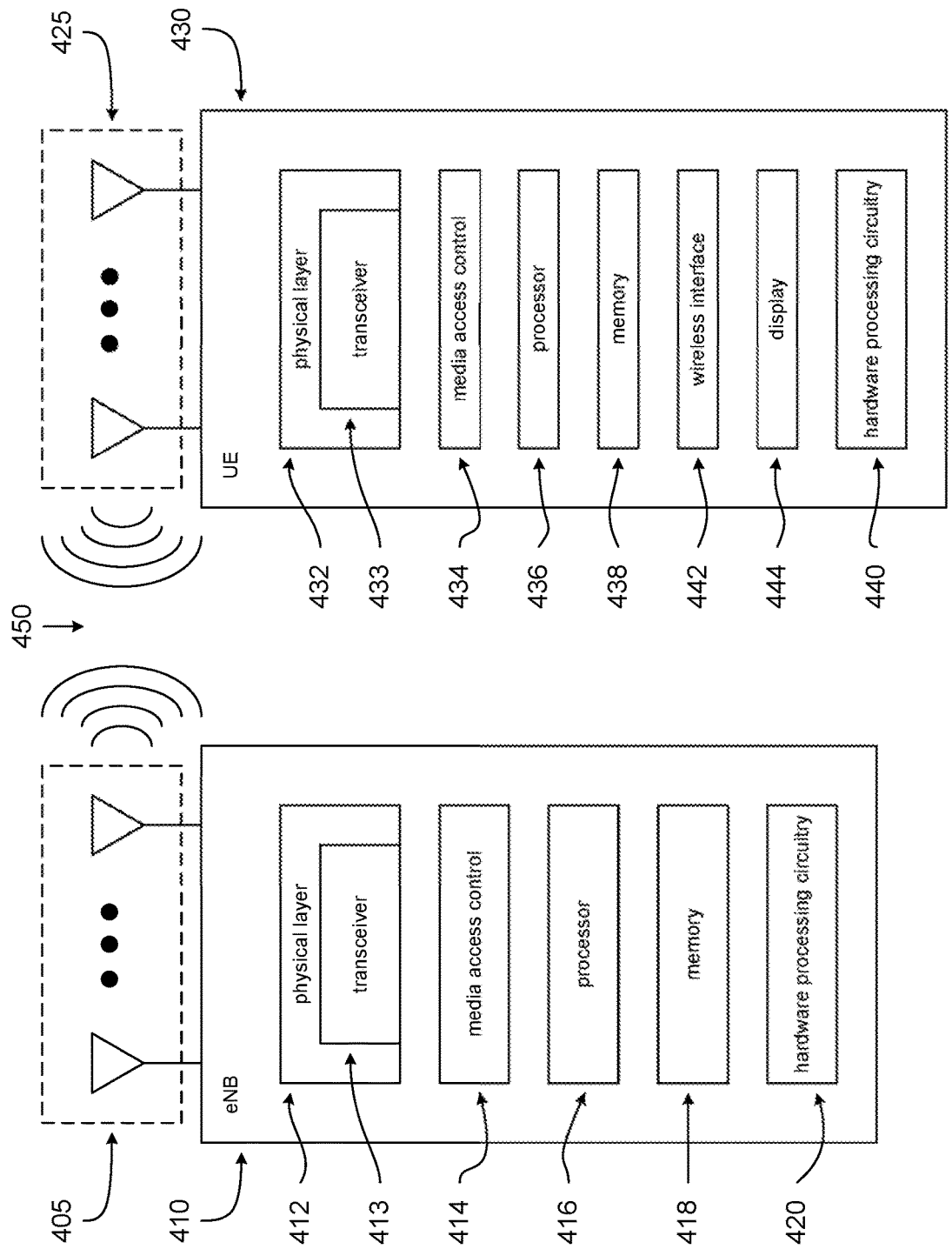
FIG. 4 illustrates an Evolved Node-B (eNB) and a UE, in accordance with some embodiments of the disclosure.

FIG. 4 illustrates an eNB and a UE, according to some embodiments. FIG. 4 includes block diagrams of an eNB 410 and a UE 430 which are operable to co-exist with each other and other elements of an LTE network. High-level, simplified architectures of eNB 410 and UE 430 are described so as not to obscure the embodiments. It should be noted that in some embodiments, eNB 410 may be a stationary non-mobile device.

eNB 410 is coupled to one or more antennas 405, and UE 430 is similarly coupled to one or more antennas 425. However, in some embodiments, eNB 410 may incorporate or comprise antennas 405, and UE 430 in various embodiments may incorporate or comprise antennas 425.

In some embodiments, antennas 405 and/or antennas 425 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 405 are separated to take advantage of spatial diversity.

eNB 410 and UE 430 are operable to communicate with each other on a network, such as a wireless network, eNB 410 and UE 430 may be in communication with each other over a wireless communication channel 450, which has both a downlink path from eNB 410 to UE 430 and an uplink path from UE 430 to eNB 410.

As illustrated in FIG. 4, in some embodiments, eNB 410 may include a physical layer circuitry 412, a MAC (media access control) circuitry 414, a processor 416, a memory 418, and a hardware processing circuitry 420. A person skilled in the art will appreciate that other components not shown may be used in addition to the components shown to form a complete eNB.

In some embodiments, physical layer circuitry 412 includes a transceiver 413 for providing signals to and from UE 430. Transceiver 413 provides signals to and from UEs or other devices using one or more antennas 405. In some embodiments, MAC circuitry 414 controls access to the wireless medium. Memory 418 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 420 may comprise logic devices or circuitry to perform various operations. In some embodiments, processor 416 and memory 418 are arranged to perform the operations of hardware processing circuitry 420, such as operations described herein with reference to logic devices and circuitry within eNB 410 and/or hardware processing circuitry 420.

Accordingly, in some embodiments, eNB 410 may be a device comprising an application processor, a memory, one or more antenna ports, and an interface for allowing the application processor to communicate with another device.

As is also illustrated in FIG. 4, in some embodiments, UE 430 may include a physical layer circuitry 432, a MAC circuitry 434, a processor 436, a memory 438, a hardware processing circuitry 440, a wireless interface 442, and a display 444. A person skilled in the art would appreciate that other components not shown may be used in addition to the components shown to form a complete UE.

In some embodiments, physical layer circuitry 432 includes a transceiver 433 for providing signals to and from eNB 410 (as well as other eNBs). Transceiver 433 provides signals to and from eNBs or other devices using one or more antennas 425. In some embodiments, MAC circuitry 434 controls access to the wireless medium. Memory 438 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 442 may be arranged to allow the processor to communicate with another device. Display 444 may provide a visual and/or tactile display for a user to interact with UE 430, such as a touch-screen display. Hardware processing circuitry 440 may comprise logic devices or circuitry to perform various operations. In some embodiments, processor 436 and memory 438 may be arranged to perform the operations of hardware processing circuitry 440, such as operations described herein with reference to logic devices and circuitry within UE 430 and/or hardware processing circuitry 440.

Accordingly, in some embodiments, UE 430 may be a device comprising an application processor, a memory, one or more antennas, a wireless interface for allowing the application processor to communicate with another device, and a touch-screen display.

Elements of FIG. 4, and elements of other figures having the same names or reference numbers, can operate or function in the manner described herein with respect to any such figures (although the operation and function of such elements is not limited to such descriptions). For example, FIGS. 5-6 and 9-10 also depict embodiments of eNBs, hardware processing circuitry of eNBs, UEs, and/or hardware processing circuitry of UEs, and the embodiments described with respect to FIG. 4 and FIGS. 5-6 and 9-10 can operate or function in the manner described herein with respect to any of the figures.

In addition, although eNB 410 and UE 430 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific integrated Circuits (ASICs), Radio-Frequency integrated Circuits (RFICs), and so on.

Figure 5:
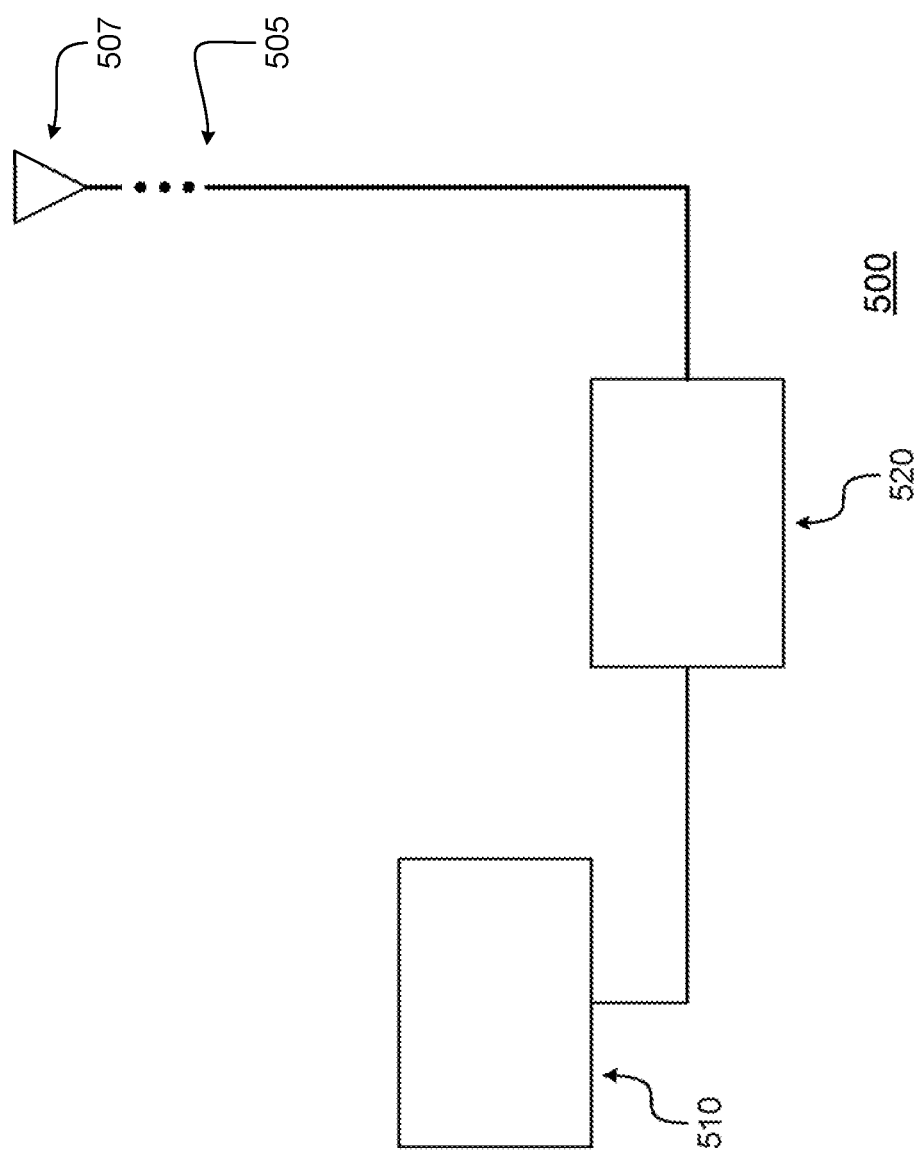
FIG. 5 illustrates hardware processing circuitries 50 for an eNB for transmitting a beam failure recovery response, according to some embodiments.

FIG. 5 illustrates hardware processing circuitries 500 for an eNB for transmitting a beam failure recovery response, according to some embodiments. With reference to FIG. 4, an eNB may include various hardware processing circuitries discussed herein (such as hardware processing circuitry 500 of FIG. 5), which may in turn comprise logic devices and/or circuitry operable to perform various operations. For example, in FIG. 4, eNB 410 (or various elements or components therein, such as hardware processing circuitry 420, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 416 (and/or one or more other processors which eNB 410 may comprise), memory 418, and/or other elements or components of eNB 410 (which may include hardware processing circuitry 420) may be arranged to perform the operations of these hardware processing circuitries, such as operations described herein with reference to devices and circuitry within these hardware processing circuitries. In some embodiments, processor 416 (and/or one or more other processors which eNB 410 may comprise) may be a baseband processor.

Returning to FIG. 5, an apparatus of eNB 410 (or another eNB or base station), which may be operable to communicate with one or more UEs on a wireless network, may comprise hardware processing circuitry 500. In some embodiments, hardware processing circuitry 500 may comprise one or more antenna ports 505 operable to provide various transmissions over a wireless communication channel (such as wireless communication channel 450). Antenna ports 505 may be coupled to one or more antennas 507 (which may be antennas 405). In some embodiments, hardware processing circuitry 500 may incorporate antennas 507, while in other embodiments, hardware processing circuitry 500 may merely be coupled to antennas 507.

Antenna ports 505 and antennas 507 may be operable to provide signals from an eNB to a wireless communications channel and/or a UE, and may be operable to provide signals from a UE and/or a wireless communications channel to an eNB. For example, antenna ports 505 and antennas 507 may be operable to provide transmissions from eNB 410 to wireless communication channel 450 (and from there to UE 430, or to another UE). Similarly, antennas 507 and antenna ports 505 may be operable to provide transmissions from a wireless communication channel 450 (and beyond that, from UE 430, or another UE) to eNB 410.

Hardware processing circuitry 500 may comprise various circuitries operable in accordance with the various embodiments discussed herein. With reference to FIG. 5, hardware processing circuitry 500 may comprise a first circuitry 510 and/or a second circuitry 520.

In some embodiments, the first circuitry 510 may be operable to process a beam failure recovery request from a UE, In some embodiments, the second circuitry 520 may be operable to generate a beam failure recovery response, for transmission to the UE.

In some embodiments, first circuitry 510 and/or second circuitry 520 may be implemented as separate circuitries. In other embodiments, first circuitry 510 and second circuitry 520 may be combined and implemented together in a circuitry without altering the essence of the embodiments.

Figure 6:
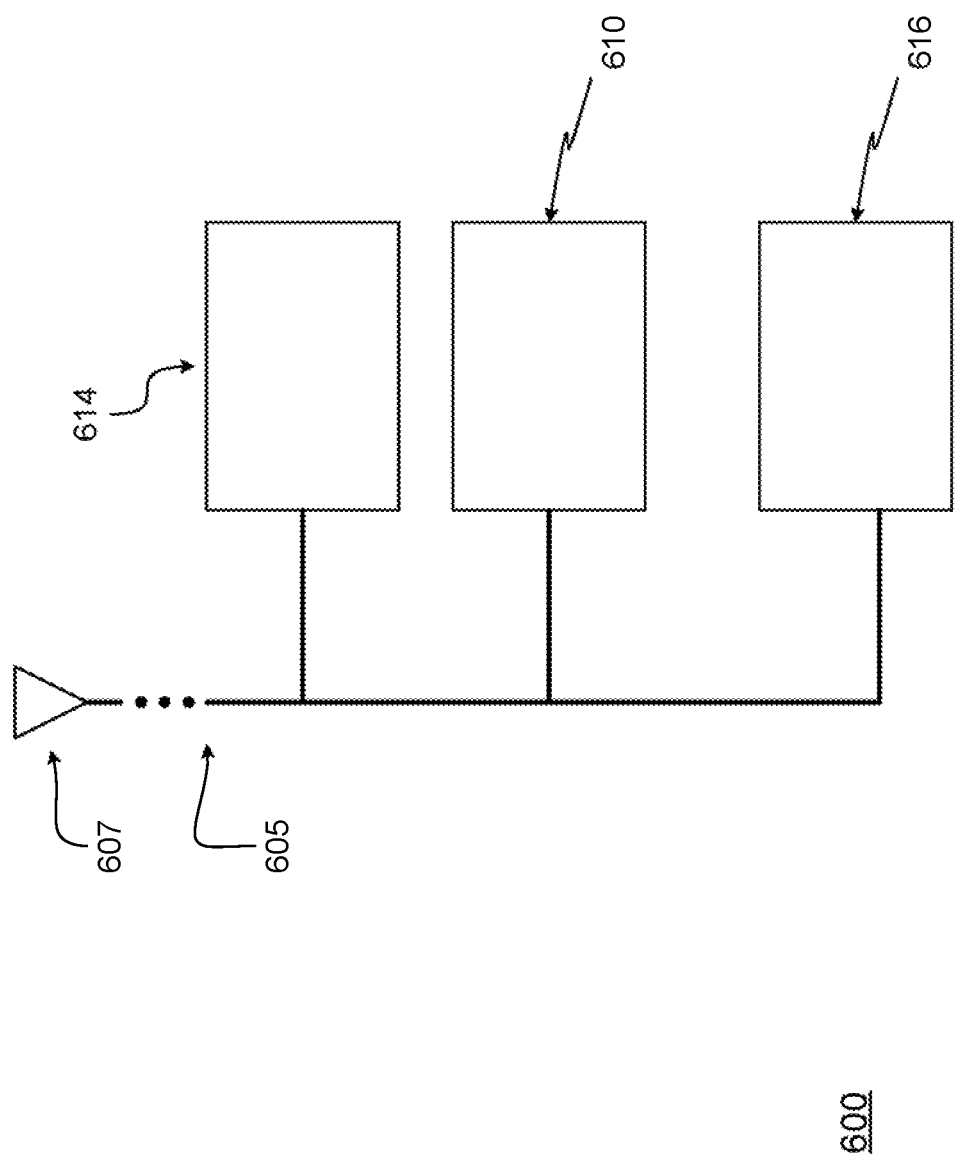
FIG. 6 illustrates hardware processing circuitries for a UE for performing beam failure recovery operation, according to some embodiments.

FIG. 6 illustrates hardware processing circuitries for a UE for performing beam failure recovery operation, according to some embodiments. With reference to FIG. 4, a UE may include various hardware processing circuitries discussed herein (such as hardware processing circuitry 600 of FIG. 6), which may in turn comprise logic devices and/or circuitry operable to perform various operations. For example, in FIG. 4, UE 430 (or various elements or components therein, such as hardware processing circuitry 440, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 436 (and/or one or more other processors which UE 430 may comprise), memory 438, and/or other elements or components of UE 430 (which may include hardware processing circuitry 440) may be arranged to perform the operations of these hardware processing circuitries, such as operations described herein with reference to devices and circuitry within these hardware processing circuitries. In some embodiments, processor 436 (and/or one or more other processors which UE 430 may comprise) may be a baseband processor.

Returning to FIG. 6, an apparatus of UE 430 (or another UE or mobile handset), which may be operable to communicate with one or more eNBs on a wireless network, may comprise hardware processing circuitry 600. In some embodiments, hardware processing circuitry 600 may comprise one or more antenna ports 605 operable to provide various transmissions over a wireless communication channel (such as wireless communication channel 450). Antenna ports 605 may be coupled to one or more antennas 607 (which may be antennas 425). In some embodiments, hardware processing circuitry 600 may incorporate antennas 607, while in other embodiments, hardware processing circuitry 600 may merely be coupled to antennas 607.

Antenna ports 605 and antennas 607 may be operable to provide signals from a UE to a wireless communications channel and/or an eNB, and may be operable to provide signals from an eNB and/or a wireless communications channel to a UE. For example, antenna ports 605 and antennas 607 may be operable to provide transmissions from UE 430 to wireless communication channel 450 (and from there to eNB 410, or to another eNB). Similarly, antennas 607 and antenna ports 605 may be operable to provide transmissions from a wireless communication channel 450 (and beyond that, from eNB 410, or another eNB) to UE 430.

Hardware processing circuitry 60 may comprise various circuitries operable in accordance with the various embodiments discussed herein. With reference to FIG. 6, hardware processing circuitry 600 may comprise a first circuitry 610, a second circuitry 614, and/or a third circuitry 616.

In some embodiments, the first circuitry 610 may be operable to detect a beam failure event. In some embodiments, the second circuitry 614 may generate a beam failure recovery request for transmission to the gNB (e.g., in response to the beam failure event). An interface may send the beam failure recovery request to a transmission circuitry, e.g., for transmission to the gNB. In some embodiments, the third circuitry 616 may monitor for PDCCH in a search space configured by the gNB, subsequent to a transmission of the beam failure recovery request.

In some embodiments, the search space is configured using higher layer signaling. In some embodiments, the search space is configured by the gNB using a higher layer parameter. In some embodiments, the PDCCH is to include a beam failure recovery response. In some embodiments, the interface is to send the beam failure recovery request to the transmission circuitry, for transmission to the gNB at slot a (n); and the UE is to monitor for the PDCCH from a slot (n+K), where K is a pre-defined integer. In some embodiments, an interface is to send the beam failure recovery request to a transmission circuitry, for transmission to the gNB at slot a (n); and the one or more circuitries are to monitor for the PDCCH from a slot (n+K), where K is a pre-configured integer.

In some embodiments, the beam failure event is associated with a failure of a first beam, and the UE (e.g., the first circuitry 610) is to process a Reference Signal (RS) that is received from the gNB via a second beam, which is different from the first beam, determine one or both of a RSRQ or a SINR for the RS; and identify the second beam for communication with the gNB, in response to one or both of the RSRQ or the SINR being higher than one or both of a first or second thresholds, respectively. In some embodiments, the RS is one of a CSI-RS (Channel State Information-Reference Signal) or an SSB (Synchronization Signal Block).

In some embodiments, to detect the beam failure event, the UE (e.g., the first circuitry 610) may monitor measurements associated with a set of RS from a single antenna port, wherein the set of RS resources are from the gNB; and detect the beam failure event, based on the measurements. In some embodiments, the measurements associated with the set of RS comprises BLER associated with the set of RS. In some embodiments, the set of RS comprises CSI-RS. In some embodiments, the set of RS comprises periodic CSI-RS. In some embodiments, the set of RS comprises one or both of periodic CSI-RS or SSB, which are QCLed with a PDCCH of a CORESET.

In some embodiments, first circuitry 610, the second circuitry 614, and/or the third circuitry 616 may be implemented as separate circuitries. In other embodiments, first circuitry 610, the second circuitry 614, and/or the third circuitry 616 may be combined and implemented together in a circuitry without altering the essence of the embodiments.

Figure 7:
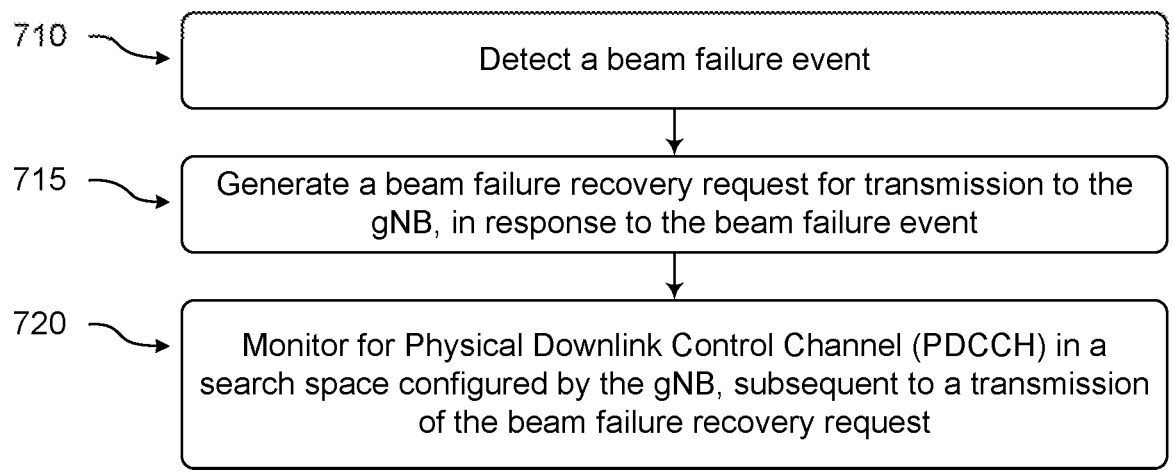
FIG. 7 illustrates a method for a UE for performing a beam failure recovery operation, in response to detection of a beam failure event, according to some embodiments.

FIG. 7 illustrates a method 700 for a UE for performing a beam failure recovery operation, in response to detection of abeam failure event, according to some embodiments. With reference to FIG. 4, the method 700 that may relate to UE 430 and hardware processing circuitry 440 are discussed herein. Although the actions in method 700 of FIG. 7 are shown in a particular order, the order of the actions can be modified. Thus, the illustrated embodiments can be performed in a different order, and some actions may be performed in parallel. Some of the actions and/or operations listed in FIG. 7 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 430 and/or hardware processing circuitry 440 to perform an operation comprising the methods of FIG. 7. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 7.

Returning to FIG. 7, the method 700 may be in accordance with the various embodiments discussed herein. The method 700 may comprise, at 710, detecting a beam failure event. At 715, the UE may generate a beam failure recovery request for transmission to the gNB, in response to the beam failure event. An interface may send the beam failure recovery request to a transmission circuitry, e.g., for transmission to the gNB. At 720, the UE may monitor for PDCCH in a search space configured by the gNB, subsequent to a transmission of the beam failure recovery request.

In some embodiments, the search space is configured using higher layer signaling. In some embodiments, the search space is configured by the gNB using a higher layer parameter. In some embodiments, the PDCCH is to include a beam failure recovery response. In some embodiments, the interface is to send the beam failure recovery request to the transmission circuitry, for transmission to the gNB at slot a (n); and the UE is to monitor for the PDCCH from a slot (n+K), where K is a pre-defined integer In some embodiments, an interface is to send the beam failure recovery request to a transmission circuitry, for transmission to the gNB at slot a (n); and the one or more circuitries are to monitor for the PDCCH from a slot (n+K), where K is a pre-configured integer.

In some embodiments, the beam failure event is associated with a failure of a first beam, and the method 700 comprises processing a Reference Signal (RS) that is received from the gNB via a second beam, which is different from the first beam; determining one or both of a RSRQ or a SINR for the RS; and identifying the second beam for communication with the gNB, in response to one or both of the RSRQ or the SINR being higher than one or both of a first or second thresholds, respectively. In some embodiments, the RS is one of a CSI-RS (Channel State Information-Reference Signal) or an SSB (Synchronization Signal Block).

In some embodiments, to detect the beam failure event, the method 700 comprises monitoring measurements associated with a set of Reference Signal (RS) from a single antenna port, wherein the set of RS resources are from the gNB; and detecting the beam failure event, based on the measurements. In some embodiments, the measurements associated with the set of RS comprises BLER associated with the set of RS. In some embodiments, the set of RS comprises CSI-RS. In some embodiments, the set of RS comprises periodic CSI-RS. In some embodiments, the set of RS comprises one or both of periodic CSI-RS or SSB, which are QCLed with a PDCCH of a CORESET.

Figure 8:
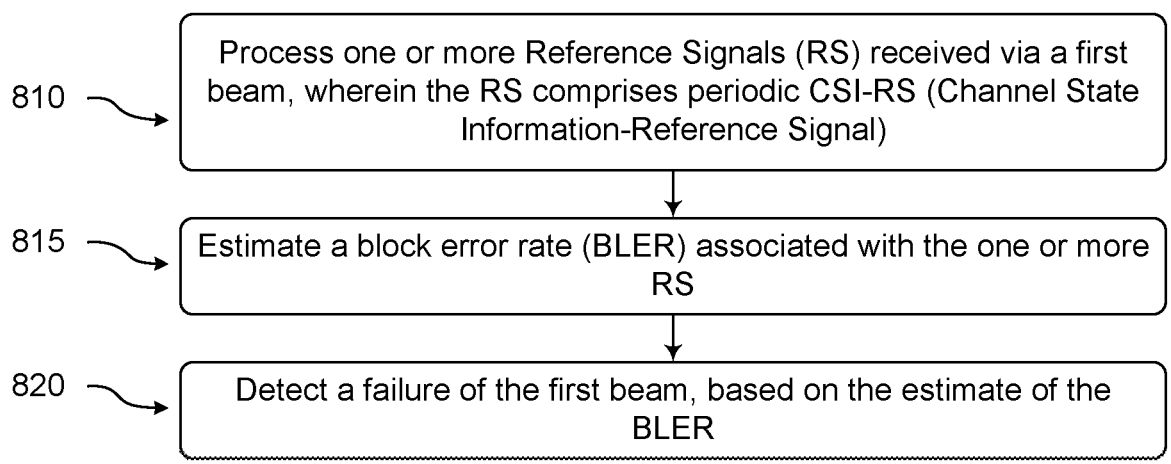
FIG. 8 illustrates a method for a UE for generating SRS transmission, based on processing an indicator that indicates an SRS resource type, according to some embodiments.

FIG. 8 illustrates a method 800 for a UE for generating SRS transmission, based on processing an indicator that indicates an SRS resource type, according to some embodiments. With reference to FIG. 4, the method 800 that may relate to UE 430 and hardware processing circuitry 440 are discussed herein. Although the actions in method 800 of FIG. 8 are shown in a particular order, the order of the actions can be modified. Thus, the illustrated embodiments can be performed in a different order, and some actions may be performed in parallel. Some of the actions and/or operations listed in FIG. 8 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 430 and/or hardware processing circuitry 440 to perform an operation comprising the methods of FIG. 8. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 8.

Returning to FIG. 8, the method 800 may be in accordance with the various embodiments discussed herein. The method 800 may comprise, at 810, processing one or more Reference Signals (RS) received via a first beam, wherein the RS comprises periodic CSI-RS. The method 800 further comprises, at 815, estimating a BLER associated with the one or more RS. The method 800 further comprises, at 8120, detecting a failure of the first beam based on the estimate of the BLER.

In some embodiments, processing one or more RS comprises processing the periodic CSI-RS that are QCLed with a PDCCH of a CORESET. In some embodiments, the RS comprises SSB that are QCLed with a PDCCH of a CORESET.

Figure 9:
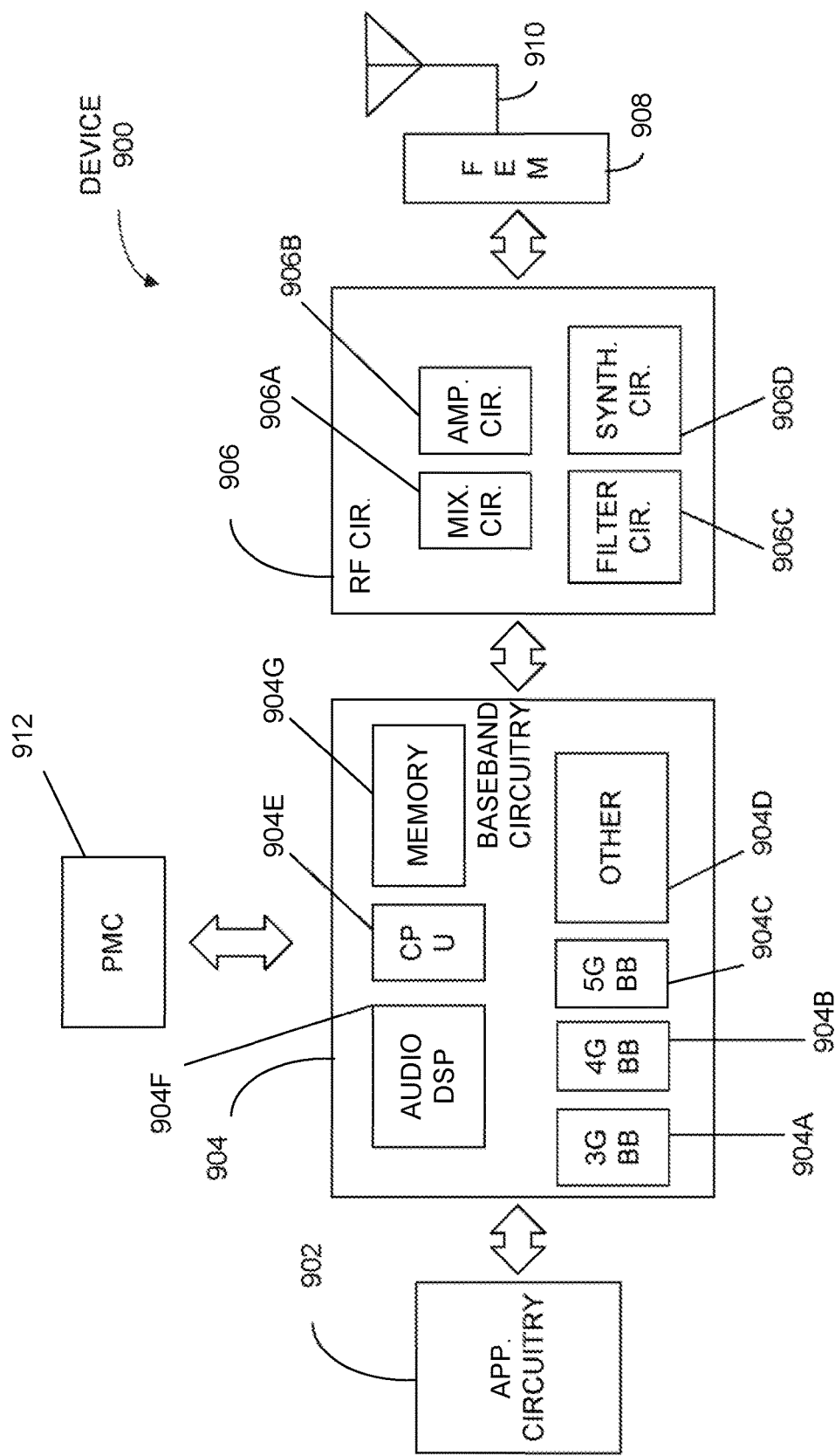
FIG. 9 illustrates example components of a device, according to some embodiments.

FIG. 9 illustrates example components of a device, in accordance with some embodiments of the disclosure. In some embodiments, the device 900 may include application circuitry 902, baseband circuitry 904, Radio Frequency (RF) circuitry 906, front-end module (FEM) circuitry 908, one or more antennas 910, and power management circuitry (PMC) 912 coupled together at least as shown. The components of the illustrated device 900 may be included in a UE or a RAN node. In some embodiments, the device 900 may include less elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, and so on). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a third generation (3G) baseband processor 904A, a fourth generation (4G) baseband processor 904B, a fifth generation (5G) baseband processor 904C, or other baseband processor(s) 904D for other existing generations, generations in development or to be developed in the future (e.g., second generation (2G), sixth generation (6G), and so on). The baseband circuitry 904 (e.g., one or more of baseband processors 904A-D) may handle various radio control functions that enable communication with one or more radio networks via the RF circuitry 906. In other embodiments, some or all of the functionality of baseband processors 904A-D may be included in modules stored in the memory 904G and executed via a Central Processing Unit (CPU) 904E. The radio control functions may include, but are not limited to, signal modulation/demodulation, encoding/decoding, radio frequency shifting, and so on. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include one or more audio digital signal processor(s)(DSP) 904F. The audio DSP(s) 904F may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

RF circuitry 90 may enable communication with wireless networks using modulated electromagnetic radiation through a non-solid medium. In various embodiments, the RF circuitry 96 may include switches, filters, amplifiers, and so on to facilitate the communication with the wireless network. RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the receive signal path of the RF circuitry 90 may include mixer circuitry 90A, amplifier circuitry 906B and filter circuitry 906C. In some embodiments, the transmit signal path of the RF circuitry 906 may include filter circuitry 906C and mixer circuitry 906A. RF circuitry 906 may also include synthesizer circuitry 906D for synthesizing a frequency for use by the mixer circuitry 906A of the receive signal path and the transmit signal path. In some embodiments, the mixer circuitry 906A of the receive signal path may be configured to down-convert RF signals received from the FEM circuitry 908 based on the synthesized frequency provided by synthesizer circuitry 906D. The amplifier circuitry 906B may be configured to amplify the down-converted signals and the filter circuitry 906C may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, mixer circuitry 906A of the receive signal path may comprise passive mixers, although the scope of the embodiments is not limited in this respect.

In some embodiments, the mixer circuitry 906A of the transmit signal path may be configured to up-convert input baseband signals based on the synthesized frequency provided by the synthesizer circuitry 906D to generate RF output signals for the FEM circuitry 908. The baseband signals may be provided by the baseband circuitry 904 and may be filtered by filter circuitry 906C.

In some embodiments, the mixer circuitry 906A of the receive signal path and the mixer circuitry 906A of the transmit signal path may include two or more mixers and may be arranged for quadrature downconversion and upconversion, respectively. In some embodiments, the mixer circuitry 906A of the receive signal path and the mixer circuitry 906A of the transmit signal path may include two or more mixers and may be arranged for image rejection (e.g., Hartley image rejection). In some embodiments, the mixer circuitry 906A of the receive signal path and the mixer circuitry 906A may be arranged for direct downconversion and direct upconversion, respectively. In some embodiments, the mixer circuitry 906A of the receive signal path and the mixer circuitry 906A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum although the scope of the embodiments is not limited in this respect.

In some embodiments, the synthesizer circuitry 906D may be a fractional-N synthesizer or a fractional N/N+1 synthesizer, although the scope of the embodiments is not limited in this respect as other types of frequency synthesizers may be suitable. For example, synthesizer circuitry 906D may be a delta-sigma synthesizer, a frequency multiplier, or a synthesizer comprising a phase-locked loop with a frequency divider.

The synthesizer circuitry 906D may be configured to synthesize an output frequency for use by the mixer circuitry 906A of the RF circuitry 906 based on a frequency input and a divider control input. In some embodiments, the synthesizer circuitry 906D may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

Synthesizer circuitry 900D of the RF circuitry 96 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 90 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. FEM circuitry 908 may also include a transmit signal path which may include circuitry configured to amplify signals for transmission provided by the RF circuitry 906 for transmission by one or more of the one or more antennas 910. In various embodiments, the amplification through the transmit or receive signal paths may be done solely in the RF circuitry 906, solely in the FEM 908, or in both the RF circuitry 906 and the FEM 908.

In some embodiments, the FEM circuitry 908 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 96). The transmit signal path of the FEM circuitry 908 may include a power amplifier (PA) to amplify input RF signals (e.g., provided by RF circuitry 96), and one or more filters to generate RF signals for subsequent transmission (e.g., by one or more of the one or more antennas 910).

In some embodiments, the PMC 912 may manage power provided to the baseband circuitry 904. In particular, the PMC 912 may control power-source selection, voltage scaling, battery charging, or DC-to-DC conversion. The PMC 912 may often be included when the device 900 is capable of being powered by a battery, for example, when the device is included in a UE. The PMC 912 may increase the power conversion efficiency while providing desirable implementation size and heat dissipation characteristics.

While FIG. 9 shows the PMC 912 coupled only with the baseband circuitry 904. However, in other embodiments, the PMC 912 may be additionally or alternatively coupled with, and perform similar power management operations for, other components such as, but not limited to, application circuitry 902, RF circuitry 906, or FEM 908.

In some embodiments, the PMC 912 may control, or otherwise be part of, various power saving mechanisms of the device 900. For example, if the device 900 is in an RRC_Connected state, where it is still connected to the RAN node as it expects to receive traffic shortly, then it may enter a state known as Discontinuous Reception Mode (DRX) alter a period of inactivity. During this state, the device 900 may power down for brief intervals of time and thus save power.

If there is no data traffic activity for an extended period of time, then the device 900 may transition off to an RRC_Idle state, where it disconnects from the network and does not perform operations such as channel quality feedback, handover, and so on. The device 900 goes into a very low power state and it performs paging where again it periodically wakes up to listen to the network and then powers down again. The device 900 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used execute Layer 3, Layer 2, or Layer 1 functionality, while processors of the application circuitry 904 may utilize data (e.g., packet data) received from these layers and further execute Layer 4 functionality (e.g., transmission communication protocol (TCP) and user diagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
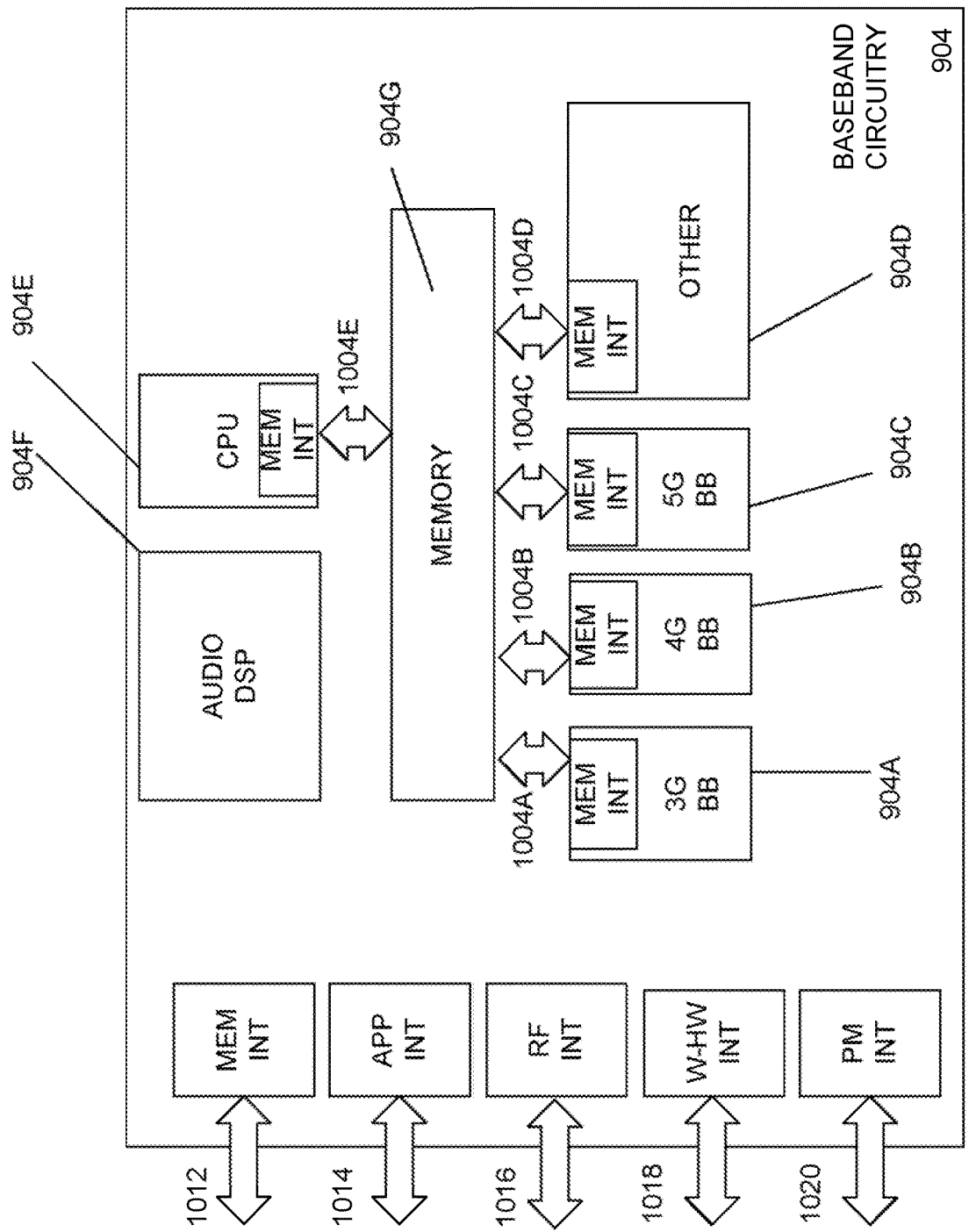
FIG. 10 illustrates example interfaces of baseband circuitry, according to some embodiments.

FIG. 10 illustrates example interfaces of baseband circuitry, in accordance with some embodiments of the disclosure. As discussed above, the baseband circuitry 904 of FIG. 9 may comprise processors 904A-904E and a memory 904G utilized by said processors. Each of the processors 904A-94E may include a memory interface, 1004A-004E, respectively, to send/receive data to/from the memory 904G.

The baseband circuitry 904 may further include one or more interfaces to communicatively couple to other circuitries/devices, such as a memory interface 1012 (e.g., an interface to send/receive data to/from memory external to the baseband circuitry 904), an application circuitry interface 1014 (e.g., an interface to send/receive data to/from the application circuitry 902 of FIG. 9), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 1020 (e.g., an interface to send/receive power or control signals to/from the PMC 912.

It is pointed out that elements of any of the Figures herein having the same reference numbers and/or names as elements of any other Figure herein may, in various embodiments, operate or function in a manner similar to those elements of the other Figure (without being limited to operating or functioning in such a manner).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean them is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1. An apparatus of a User Equipment (UE) operable to communicate with a fifth-generation Evolved Node B (gNB) on a wireless network, comprising: one or more processors to: detect a beam failure event, generate a beam failure recovery request for transmission to the gNB, in response to the beam failure event, and monitor for Physical Downlink Control Channel (PDCCH) in a search space configured by the gNB, subsequent to a transmission of the beam failure recovery request; and an interface for sending the beam failure recovery request to a transmission circuitry.

Example 2. The apparatus of example 1 or any other example, wherein: the search space is configured using higher layer signaling.

Example 3. The apparatus of example 1 or any other example, wherein: the search space is configured by the gNB using a higher layer parameter.

Example 4. The apparatus of example 1 or any other example, wherein: the PDCCH includes a beam failure recovery response.

Example 5. The apparatus of example 1 or any other example, wherein the one or more processors are to: send the beam failure recovery request to the transmission circuitry, for transmission to the gNB at a slot (n); and monitor for the PDCCH from a slot (n+K), where K is a pre-defined integer.

Example 6. The apparatus of example 1 or any other example, wherein the one or more processors are to: send the beam failure recovery request to the transmission circuitry, for transmission to the gNB at a slot (n); and monitor for the PDCCH from a slot (n+K), where K is a pre-configured integer.

Example 7. The apparatus of example 1 or any other example, wherein the beam failure event is associated with a failure of a first beam and the one or more processors are to: process a Reference Signal (RS) that is received from the gNB via a second beam different from the first beam; determine one or both of a Reference Signal Receive Quality (RSRQ) for the RS or a Signal to Interference Noise Ratio (SINR) for the RS; and identify the second beam for communication with the gNB, in response to one or both of the RSRQ or the SINR being higher than one or both of a first threshold and a second threshold, respectively.

Example 8. The apparatus of example 7 or any other example, wherein the RS is one of a Channel State Information Reference Signal (CSI-RS) or a Synchronization Signal Block (SSB).

Example 9. The apparatus of example 1 or any other example, wherein to detect the beam failure event, the one or more processors are to: monitor measurements associated with a set of Reference Signal (RS) resources from a single antenna port, wherein the set of RS resources are from the gNB; and detect the beam failure event, based on the measurements associated with the set of RS resources.

Example 10. The apparatus of example 9 or any other example, wherein the measurements associated with the set of RS resources comprise a block error rate (BLER) associated with the set of RS resources.

Example 11. The apparatus of example 9 or any other example, wherein the set of RS resources comprises Channel State Information Reference Signal (CSI-RS).

Example 12. The apparatus of example 9 or any other example, wherein the set of RS resources comprises periodic Channel State Information-Reference Signal (CSI-RS).

Example 13. The apparatus of example 9 or any other example, wherein the set of RS resources comprises one or both of periodic Channel State Information-Reference Signal (CSI-RS) or Synchronization Signal Block (SSB), which are Quasi Co-Located (QCLed) with a PDCCH of a Control Resource Set (CORESET).

Example 14. A User Equipment (UE) device comprising an application processor, a memory, one or more antennas, a wireless interface for allowing the application processor to communicate with another device, and a touch-screen display, the UE device including the apparatus of example 1 or any other example.

Example 15. Machine readable storage media having machine executable instructions that, when executed, cause one or more processors of a User Equipment (UE) operable to communicate with a fifth-generation Evolved Node B (gNB) on a wireless network to perform an operation comprising: detect a beam failure event, generate a beam failure recovery request for transmission to the gNB, in response to the beam failure event; send the beam failure recovery request to a transmission circuitry; and monitor for Physical Downlink Control Channel (PDCCH) in a search space configured by the gNB, subsequent to a transmission of the beam failure recovery request.

Example 16. The machine readable storage media of example 15 or any other example, wherein: the search space is configured using a higher layer parameter.

Example 17. The machine readable storage media of example 15 or any other example, wherein the operation comprises: send the beam failure recovery request to the transmission circuitry, for transmission to the gNB at a slot (n): and monitor for the PDCCH from a slot (n+K) onwards, where K is a pre-defined integer or a pre-configured integer.

Example 18. The machine readable storage media of example IS or any other example, wherein to detect the beam failure event, the operation comprises: monitor measurements associated with a set of Reference Signal (RS) resources from a single antenna port, wherein the set of RS resources are from the gNB; and detect the beam failure event, based on the measurements associated with the set of RS resources.

Example 19. The machine readable storage media of example 16 or any other example, wherein: the measurements associated with the set of RS resources comprise a block error rate (BLER) associated with the set of RS resources; and the set of RS resources comprises Channel State Information Reference Signal (CSI-RS).

Example 20. An apparatus of a User Equipment (UE) operable to communicate with a fifth-generation Evolved Node B (gNB) on a wireless network, comprising: one or more processors to: process one or more Reference Signals (RSes) received via a first beam, wherein the one or more RSes comprise a periodic Channel State Information-Reference Signal (CSI-RS); estimate a block error rate (BLER) associated with the one or more RSes; and detect a failure of the first beam, based on the estimate of the BLER.

Example 21. The apparatus of example 20 or any other example, wherein to process the one or more processors are to: process the periodic CSI-RS that are Quasi Co-Located (QCLed) with a Physical Downlink Control Channel (PDCCH) of a Control Resource Set (CORESET).

Example 22. The apparatus of example 20 or any other example, wherein the one or more RSes comprise Synchronization Signal Block (SSB) that are Quasi Co-Located (QCLed) with a Physical Downlink Control Channel (PDCCH) of a Control Resource Set (CORESET).

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. A User Equipment (UE) operable to communicate with a base station (BS) on a wireless network, comprising:
    one or more processors configured to:
       monitor measurements associated with a set of Reference Signal (RS) resources from two or more antenna ports, wherein the measurements comprise a block error rate (BLER) calculated based on a precoding cycling using a predefined codebook;
       determine a beam failure event, based on the measurements; and
       generate a beam failure recovery request for transmission to the BS, in response to the beam failure event; and
       monitor a Physical Downlink Control Channel (PDCCH) in a search space configured by the BS, subsequent to a transmission of the beam failure recovery request; and
    an interface for sending the beam failure recovery request to a transmission circuitry.

2. The UE of claim 1, wherein:
    the search space is configured using higher layer signaling.

3. The UE of claim 1, wherein:
    the search space is configured by the BS using a higher layer parameter.

4. The UE of claim 1, wherein:
    the PDCCH includes a beam failure recovery response.

5. The UE of claim 1, wherein the one or more processors are configured to:
    send the beam failure recovery request to the transmission circuitry, for transmission to the BS at a slot (n); and
    monitor the PDCCH from a slot (n+K), where K is a predefined integer.

6. The UE of claim 1, wherein the one or more processors are configured to:
    send the beam failure recovery request to the transmission circuitry, for transmission to the BS at a slot (n); and
    monitor the PDCCH from a slot (n+K), where K is a preconfigured integer.

7. The UE of claim 1, wherein the beam failure event is associated with a failure of a first beam, and the one or more processors are further configured to:
    process an RS in the set of RS resources that is received from the BS via a second beam different from the first beam;
    determine a Reference Signal Receive Quality (RSRQ) or a Signal to Interference Noise Ratio (SINR) for the RS; and
    identify the second beam for communication with the BS, in response to the RSRQ or the SINR being higher than a first threshold or a second threshold, respectively.

8. The UE of claim 1, wherein the precoding cycling used to calculate the BLER comprises a precoding matrix indicator (PMI) or a rank indicator from the predefined codebook.

9. The UE of claim 1, wherein the set of RS resources comprise a Channel State Information Reference Signal (CSI-RS), or a Synchronization Signal Block (SSB).

10. The UE of claim 1, wherein the set of RS resources comprise a periodic Channel State Information-Reference Signal (CSI-RS).

11. The UE of claim 1, wherein the set of RS resources comprise a periodic Channel State Information-Reference Signal (CSI-RS) or a Synchronization Signal Block (SSB), which are Quasi Co-Located (QCLed) with the PDCCH of a Control Resource Set (CORESET).

12. The UE of claim 1, further comprising:
    an application processor, a memory, one or more antennas, a wireless interface for allowing the application processor to communicate with another device, and a touch-screen display.

13. A non-transitory machine readable storage media having machine executable instructions that, when executed, cause one or more processors of a User Equipment (UE) operable to communicate with a base station (BS) on a wireless network to perform operations comprising:
    monitoring measurements associated with a set of Reference Signal (RS) resources from two or more antenna ports, wherein the measurements comprise a block error rate (BLER) calculated based on a precoding cycling using a predefined codebook;
    determining a beam failure event, based on the measurements associated with the set of RS resources;
    generating a beam failure recovery request for transmission to the BS, in response to the beam failure event;
    sending the beam failure recovery request to a transmission circuitry; and
    monitoring a Physical Downlink Control Channel (PDCCH) in a search space configured by the BS.

14. The non-transitory machine readable storage media of claim 13, wherein the search space is configured using a higher layer parameter.

15. The non-transitory machine readable storage media of claim 13, wherein the operations further comprise:
   sending the beam failure recovery request to the transmission circuitry, for transmission to the BS at a slot (n); and
   monitoring the PDCCH from a slot (n+K) onwards, where K is a predefined integer or a preconfigured integer.

16. The non-transitory machine readable storage media of claim 13, wherein:
   the set of RS resources comprise a Channel State Information Reference Signal (CSI-RS).

17. A User Equipment (UE) operable to communicate with a base station (BS) on a wireless network, comprising:
   one or more processors configured to:
      determine a failure of a first beam based on measurements from two or more antenna ports, wherein the measurements comprise a block error rate (BLER) calculated based on a precoding cycling using a predefined codebook;
      process one or more Reference Signals (RSes) received via a second beam different from the first beam, wherein the one or more RSes comprise a periodic Channel State Information-Reference Signal (CSI-RS);
      determine a Reference Signal Receive Quality (RSRQ) or a Signal to Interference Noise Ratio (SINR) for the one or more RSes; and
      identify the second beam for communication with the BS, in response to the RSRQ or the SINR being higher than a first threshold or a second threshold, respectively.

18. The UE of claim 17, wherein to process the one or more RSes, the one or more processors are configured to:
   process the periodic CSI-RS that are Quasi Co-Located (QCLed) with a Physical Downlink Control Channel (PDCCH) of a Control Resource Set (CORESET).

19. The UE of claim 17, wherein the one or more RSes further comprise a Synchronization Signal Block (SSB) that is Quasi Co-Located (QCLed) with a Physical Downlink Control Channel (PDCCH) of a Control Resource Set (CORESET).

20. The UE of claim 17, wherein the first threshold is associated with a 1-port CSI-RS and the second threshold is associated with a 2-port CSI-RS.

* * * * *